(12) United States Patent
Yoshida

(10) Patent No.: US 9,836,319 B2
(45) Date of Patent: Dec. 5, 2017

(54) INFORMATION SHARING PROGRAM, INFORMATION SHARING SYSTEM AND INFORMATION SHARING METHOD

(71) Applicant: FUJITSU LIMITED, Kawasaki-shi, Kanagawa (JP)

(72) Inventor: Taketoshi Yoshida, Kunitachi (JP)

(73) Assignee: FUJITSU LIMITED, Kawasaki (JP)

( * ) Notice: Subject to any disclaimer, the term of this patent is extended or adjusted under 35 U.S.C. 154(b) by 106 days.

(21) Appl. No.: 14/840,544

(22) Filed: Aug. 31, 2015

(65) Prior Publication Data

US 2016/0098290 A1 Apr. 7, 2016

(30) Foreign Application Priority Data

Oct. 2, 2014 (JP) .................................. 2014-203560

(51) Int. Cl.
*G06F 9/455* (2006.01)

(52) U.S. Cl.
CPC .. *G06F 9/45558* (2013.01); *G06F 2009/4557* (2013.01); *G06F 2009/45562* (2013.01)

(58) Field of Classification Search
None
See application file for complete search history.

(56) References Cited

U.S. PATENT DOCUMENTS

| 6,259,705 | B1 * | 7/2001 | Takahashi | ............... | H04L 47/10 370/230 |
| 6,438,745 | B1 | 8/2002 | Kanamaru et al. | | |
| 2004/0088397 | A1 | 5/2004 | Becker et al. | | |
| 2004/0230643 | A1 * | 11/2004 | Thibault | .......... | G05B 19/41835 709/201 |
| 2008/0163207 | A1 * | 7/2008 | Reumann | ............ | H04L 63/0263 718/1 |
| 2013/0185721 | A1 * | 7/2013 | Ikegami | .............. | G06F 9/45558 718/1 |
| 2014/0208317 | A1 * | 7/2014 | Nakagawa | .......... | G06F 9/45533 718/1 |

FOREIGN PATENT DOCUMENTS

| JP | 2000-132403 | 5/2000 |
| JP | 2004-158012 | 6/2004 |

* cited by examiner

*Primary Examiner* — Kenneth Tang
(74) *Attorney, Agent, or Firm* — Fujitsu Patent Center

(57) ABSTRACT

A non-transitory computer-readable storage medium storing therein an information sharing program for causing a computer to execute a process includes storing, in a storage, conversion information including first processing request information for issuing a processing request to a first processing processor that operates on a first physical machine, first operating environment information relating to an operating environment of the first physical machine and corresponding to the first processing request information, and second operating environment information relating to an operating environment of a second physical machine and corresponding to second processing request information for issuing a processing request to a second processing processor that operates on the second physical machine, and when a virtual machine that operates on the first physical machine transfers to the second physical machine, causing the second physical machine to hold the conversion information.

7 Claims, 22 Drawing Sheets

FIG.17

CONVERSION INFORMATION (INITIAL STATE)

| PROCESS NAME | METADATA | OPERATING ENVIRONMENT INFORMATION | AUTHENTICATION INFORMATION |
|---|---|---|---|
| MON-A | USER NAME | User | |
| MON-B | | Login | |
| MON-C | | User | |
| MON-A | PASSWORD | Password | |
| MON-B | | PWD | |
| MON-C | | Password | |
| MON-A | AUTHENTICATION KEY | KEY | |
| MON-B | | Hash | |
| MON-C | | Pass-key | |

FIG.18

CONVERSION INFORMATION (S34, S37)

| PROCESS NAME | METADATA | OPERATING ENVIRONMENT INFORMATION | AUTHENTICATION INFORMATION |
|---|---|---|---|
| MON-A | USER NAME | User | A531 |
| MON-B | | Login | |
| MON-C | | User | |
| MON-A | PASSWORD | Password | 1234 |
| MON-B | | PWD | |
| MON-C | | Password | |
| MON-A | AUTHENTICATION KEY | KEY | |
| MON-B | | Hash | |
| MON-C | | Pass-key | |

FIG.19

CONVERSION INFORMATION (S44)

| PROCESS NAME | METADATA | OPERATING ENVIRONMENT INFORMATION | AUTHENTICATION INFORMATION |
|---|---|---|---|
| MON-A | USER NAME | User | A531 |
| MON-B | | Login | |
| MON-C | | User | |
| MON-A | PASSWORD | Password | 1234 |
| MON-B | | PWD | |
| MON-C | | Password | |
| MON-A | AUTHENTICATION KEY | KEY | 2b3kkdzi7 |
| MON-B | | Hash | |
| MON-C | | Pass-key | |

FIG.20

ARGUMENT CONVERSION INFORMATION(S46, S76)

| PROCESS NAME | METADATA | ARGUMENT INFORMATION |
|---|---|---|
| MON-A | CPU USE INFORMATION ACQUISITION COMMAND | AAA |
| MON-B | | BBB |
| MON-C | | CCC |
| MON-A | MEMORY USE INFORMATION ACQUISITION COMMAND | DDD |
| MON-B | | EEE |
| MON-C | | FFF |

FIG.21

CONVERSION INFORMATION (S64, S67)

| PROCESS NAME | METADATA | OPERATING ENVIRONMENT INFORMATION | AUTHENTICATION INFORMATION |
|---|---|---|---|
| MON-A | USER NAME | User | A531 |
| MON-B | | Login | 142_A3 |
| MON-C | | User | |
| MON-A | PASSWORD | Password | 1234 |
| MON-B | | PWD | 24dfek |
| MON-C | | Password | |
| MON-A | AUTHENTICATION KEY | KEY | 2b3kkdzi7 |
| MON-B | | Hash | |
| MON-C | | Pass-key | |

FIG.22

CONVERSION INFORMATION (S74)

| PROCESS NAME | METADATA | OPERATING ENVIRONMENT INFORMATION | AUTHENTICATION INFORMATION |
|---|---|---|---|
| MON-A | USER NAME | User | A531 |
| MON-B | | Login | 142_A3 |
| MON-C | | User | |
| MON-A | PASSWORD | Password | 1234 |
| MON-B | | PWD | 24dfek |
| MON-C | | Password | |
| MON-A | AUTHENTICATION KEY | KEY | 2b3kkdzi7 |
| MON-B | | Hash | G49vk3xE |
| MON-C | | Pass-key | |

INFORMATION SHARING PROGRAM, INFORMATION SHARING SYSTEM AND INFORMATION SHARING METHOD

CROSS-REFERENCE TO RELATED APPLICATION

This application is based upon and claims the benefit of priority of the prior Japanese Patent Application No. 2014-203560, filed on Oct. 2, 2014, the entire contents of which are incorporated herein by reference.

FIELD

The present invention relates to an information sharing program, an information sharing system and an information sharing method.

BACKGROUND

In recent years, with improvements in the performance of physical devices (also called "physical machines" below), research has been advancing in virtualization technology wherein a plurality of virtual devices (also called "virtual machines" below) are integrated into one physical machine. This virtualization technology makes it possible, for example, to assign a physical machine to a plurality of virtual machines by virtualization software (hypervisor) and to provide services by application programs (also called simply "applications" below) which are installed in the respective virtual machines.

In a virtual machine that is operating, all or a portion of the contents (called "disk image" below) making up the virtual machine may be transferred to a virtual machine created in another physical machine. By this means, an operator providing services (simply called "operator" below) can, for example, transfer the disk image of a virtual machine created in a physical machine which is close to a 100% CPU use rate, to a virtual machine created in another physical machine which has spare capacity (see, for example, Japanese Laid-open Patent Publication No. 2000-132403 and Japanese Laid-open Patent Publication No. 2004-158012).

SUMMARY

Physical machines on which virtual machines are operating may be running a monitoring system for supervising the operational status of the virtual machines or a billing system for billing a user of the services provided by the virtual machines (also called simply "user" below), for example. In these cases, the user sends a processing request to the monitoring system, or the like, via an application running on a virtual machine, for example. The monitoring system, or the like, which receives the processing request executes processing corresponding to the processing request, and sends the result of the processing to the virtual machine. Consequently, the user is able to acquire information relating to the current operational status of the virtual machine, or the like.

Here, when virtual machines are transferred, there may occur cases where the representation of the information necessary to execute the respective processes differs between the monitoring system, or the like, running on the physical machine which is the transfer source, and the monitoring system, or the like, running on the physical machine which is the transfer destination. In this case, the transferred virtual machine cannot associate the information used in order to carry out the processing request before transfer, with the information required in order to carry out the processing request after transfer. Consequently, the transferred virtual machine may not be able to carry out the processing request in respect of a process running on the transfer-destination physical machine.

According to an aspect of the embodiments, a non-transitory computer-readable storage medium storing therein an information sharing program for causing a computer to execute a process includes: storing, in a storage, conversion information including first processing request information for issuing a processing request to a first processing processor that operates on a first physical machine, first operating environment information relating to an operating environment of the first physical machine and corresponding to the first processing request information, and second operating environment information relating to an operating environment of a second physical machine and corresponding to second processing request information for issuing a processing request to a second processing processor that operates on the second physical machine; and when a virtual machine that operates on the first physical machine transfers to the second physical machine, until transfer of the virtual machine to the second physical machine is completed, causing the second physical machine to hold the conversion information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 17 is a diagram illustrating the details of an information sharing process according to the first embodiment.

FIG. 18 is a diagram illustrating the details of an information sharing process according to the first embodiment.

FIG. 19 is a diagram illustrating the details of an information sharing process according to the first embodiment.

FIG. 20 is a diagram illustrating the details of an information sharing process according to the first embodiment.

FIG. 21 is a diagram illustrating the details of an information sharing process according to the first embodiment.

FIG. 22 is a diagram illustrating the details of an information sharing process according to the first embodiment.

DESCRIPTION OF EMBODIMENTS (Configuration of Information Processing System)

Figure 1:
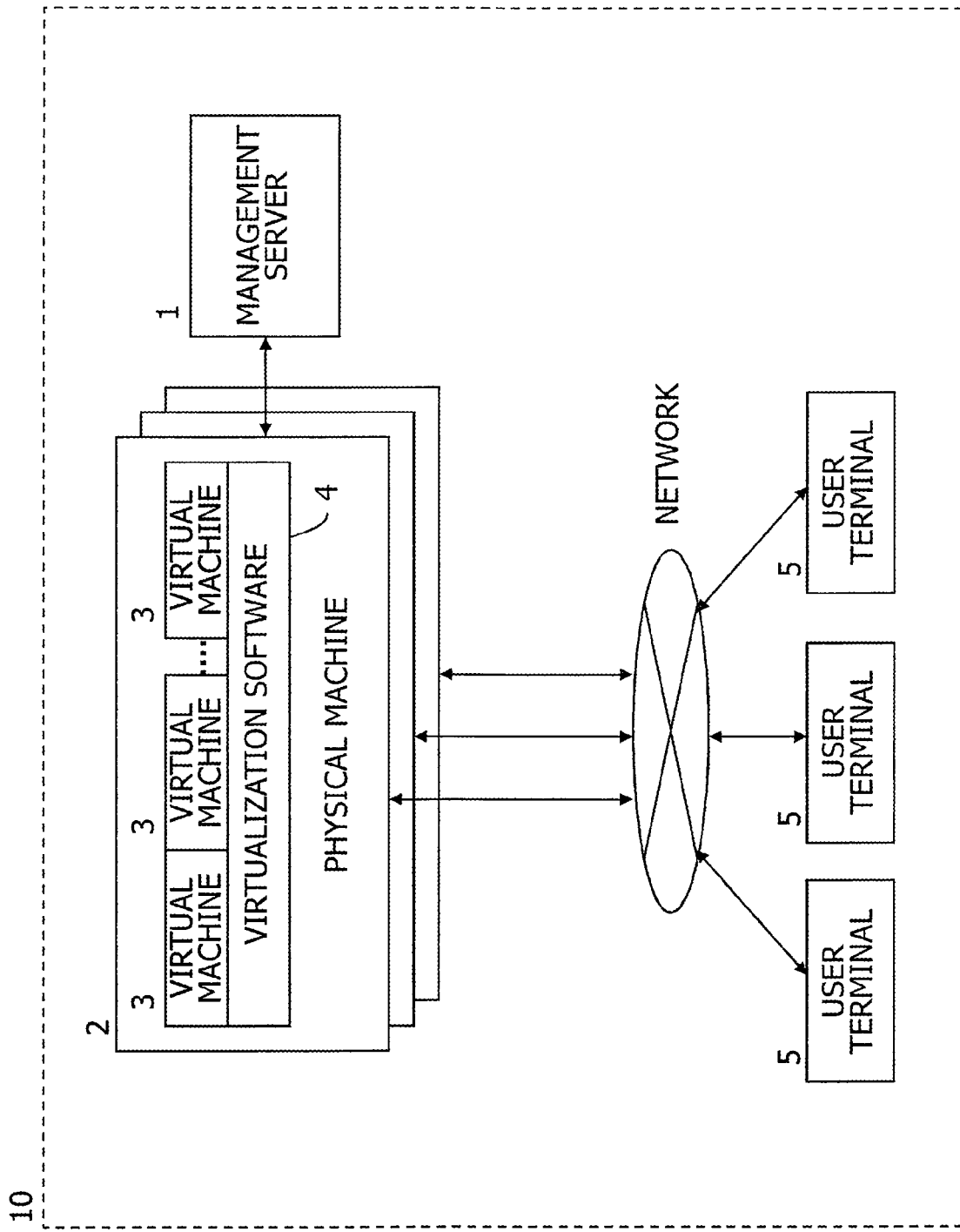
FIG. 1 is a diagram illustrating an overall configuration of an information processing system.

FIG. 1 is a diagram illustrating an overall configuration of an information processing system. The information processing system 10 illustrated in FIG. 1 includes a management server 1 and physical machines 2 which creates virtual machines (VM), in a data center, for example. The data center can be accessed from a user terminal 5 via a network, such as an Intranet or the Internet.

The physical machines 2 are configured by a plurality of physical machines in the example in FIG. 1, and each physical machine has a central processing unit (CPU), a random access memory (RAM), and a large-capacity memory, such as a hard disk (hard disk drive (HDD)), and the like. The resources of the physical machines 2 are allocated to a plurality of virtual machines 3.

A management server 1 is capable of accessing the physical machines 2, for example, and issues instructions for creating virtual machines 3 in the physical machines 2, as well as managing the virtual machines 3 that are created.

The virtual machines 3, for example, are used by an operator to provide infrastructure services to users via a network (for example, cloud services). A cloud service is a service in which the actual basis for constructing and operating a computer system, in other words, infrastructure in itself such as virtual machines 3 and/or networks, etc., is provided via a network. Furthermore, a user accesses a cloud service portal site from a user terminal 5, for example, and selects the specifications required in the virtual machines, for example, the CPU clock frequency, memory capacity (GB), hard disk capacity (MB/sec, IOPS), and the network communication bandwidth (Gbps), and enters into a cloud use contract in respect of same. Furthermore, the user terminal 5 is also able to monitor the operational state of the virtual machines 3 and/or regulate the virtual machines, and so on.

The virtualization software 4 is basic software which operates the virtual machines 3 by allocating the CPU, memory, hard disk and network of the physical machines 2, in accordance with instructions from the management server 1. The virtualization software 4 runs on a physical machine 2, for example.

The virtual machines 3, in addition to receiving allocation of resources of the physical machines 2, have, in the hard disks thereof, an image file including an operating system (OS), middle ware, applications, database, and the like. The virtual machine 3 writes the image file to the memory from the hard disk upon starting up, and performs operations in accordance with the desired services.

(Transfer of a Virtual Machine)

Figure 2:
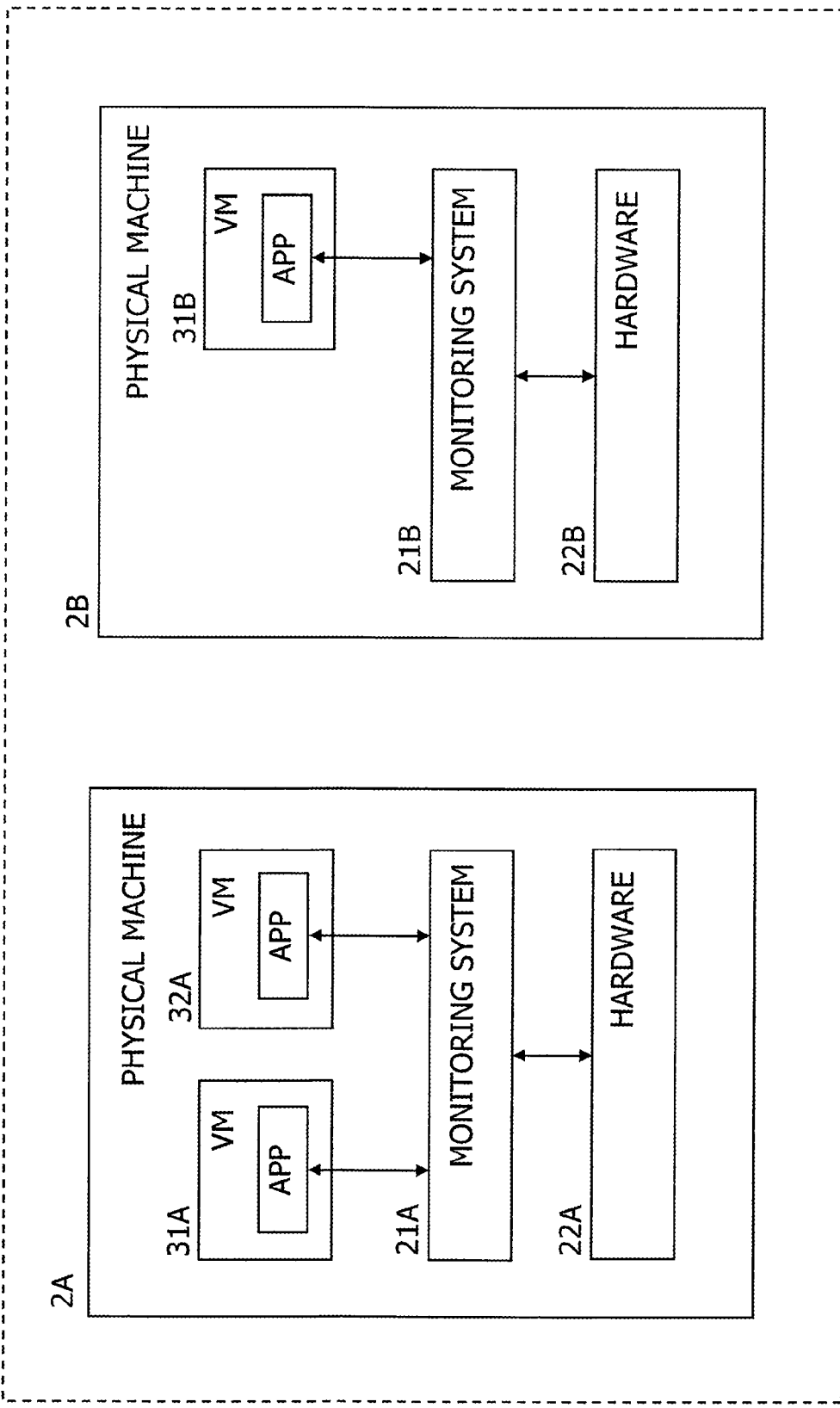
FIG. 2 is a diagram illustrating the transfer of a virtual machine.
Figure 3:
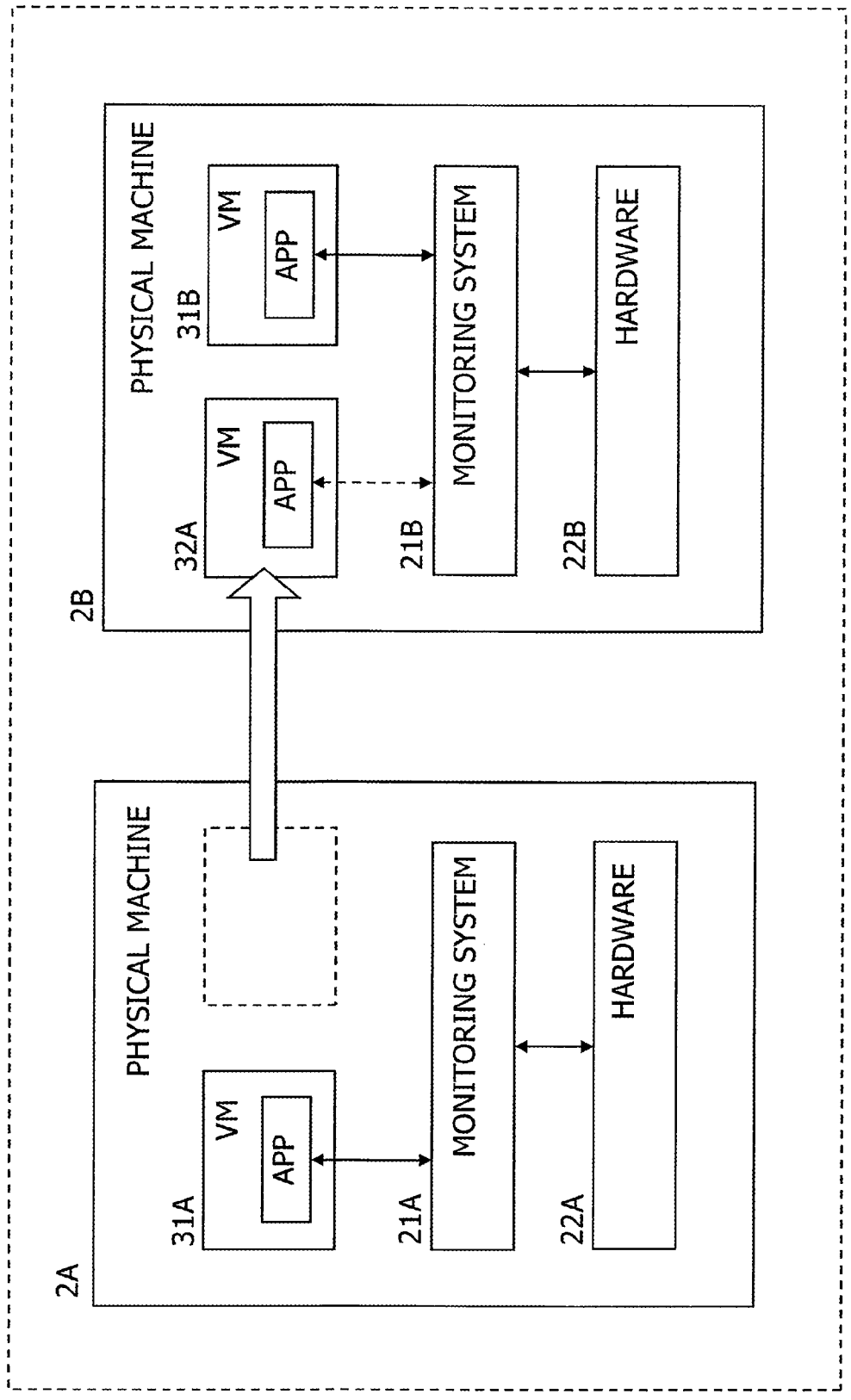
FIG. 3 is a diagram illustrating the transfer of a virtual machine.

Next, the transfer of a virtual machine will be described. FIGS. 2 and 3 are diagrams illustrating the transfer of a virtual machine.

In the example illustrated in FIG. 2, a virtual machine 31A, a virtual machine 32A and a monitoring system 21A (also called "first processing unit 21A" below) are provided in the physical machine 2A. Furthermore, the physical machine 2A has hardware 22A. On the other hand, a virtual machine 31B and a monitoring system 21B (also called "second processing unit 21B" below) are provided in the physical machine 2B. Moreover, the physical machine 2B has hardware 22B.

The monitoring systems 21A, 21B in the example in FIG. 2, for example, each periodically access the hardware 22A, 22B, and acquire the use amount of the resources (for example, CPU and/or memory) of the hardware 22A, 22B used by the virtual machines. If the use amount of the resources used by the virtual machines exceeds the upper limit of a predetermined range, then the monitoring systems 21A and 21B request the management server 1 illustrated in FIG. 1 to create a new virtual machine. Furthermore, the monitoring systems 21A, 21B request the deletion of any of the virtual machines which have been created by the management server 1 illustrated in FIG. 1, if the use amount of the resources used by the virtual machines is lower than a lower limit of the predetermined range. Consequently, the operator can efficiently create and delete virtual machines, and can restrict the used amount of the resources of the physical machines.

More specifically, in the example illustrated in FIG. 2, when it is detected that the use amount of the resources of the hardware 22A is greater than the upper limit of the predetermined range, then the monitoring system 21A sends the management server 1 a request for the transfer of the virtual machine 31A or the virtual machine 32A to another physical machine. As illustrated in FIG. 3, for example, the management server 1 then transfers the virtual machine 32A to the physical machine 2B. Accordingly, the operator can restrict the use amount of the resources of the hardware 22A of the physical machine 2.

Here, for example, the monitoring system 21A and the monitoring system 21B may have different representations, etc. of the information required in order for the virtual machines to carry out processing requests. More specifically, this corresponds to a case where, for example, in the monitoring system 21A, the information corresponding to the user name and password is represented as "User" and "Password", whereas in the monitoring system 21B, the information is represented as "Login" and "PWD". Therefore, even if, for instance, the transferred virtual machine 32A has information such as the user name used in the monitoring system 21B, the virtual machine 32A is not able to associate this with the user name, etc. used in the monitoring system 21A. Therefore, the virtual machine 32A after transfer is not able to carry out the processing request in the monitoring system 21B, in this case.

On the other hand, there are cases where, for instance, the information required in order to carry out a processing request in the monitoring system 21B is set previously in the virtual machine 32A that is being transferred. However, the information required in order to carry out the processing request in the monitoring system 21B may be information that is first defined when the transferred virtual machine 32A is started up in the physical machine 2B. Therefore, the operator cannot previously set all of the information required in order to carry out a processing request in the monitoring system 21B, in the virtual machine 32A before transfer. Consequently, the operator must interrupt the provision of services by the virtual machine 32A after transfer of the virtual machine 32A, and set the information for carrying out a processing request in the monitoring system 21B.

Therefore, in the present embodiment, in accordance with the transfer of a virtual machine 32A, the transfer-destination physical machine 2B is made to hold information for carrying out a processing request to the processes running in the transfer-source physical machine 2A, and information relating to the environments of the transfer-source physical machine 2A and the transfer-destination physical machine 2B. Consequently, the operator is able to prevent the interruption of services in association with the transfer of a virtual machine 32A.

(Hardware Configuration of Physical Machines)

Figure 4:
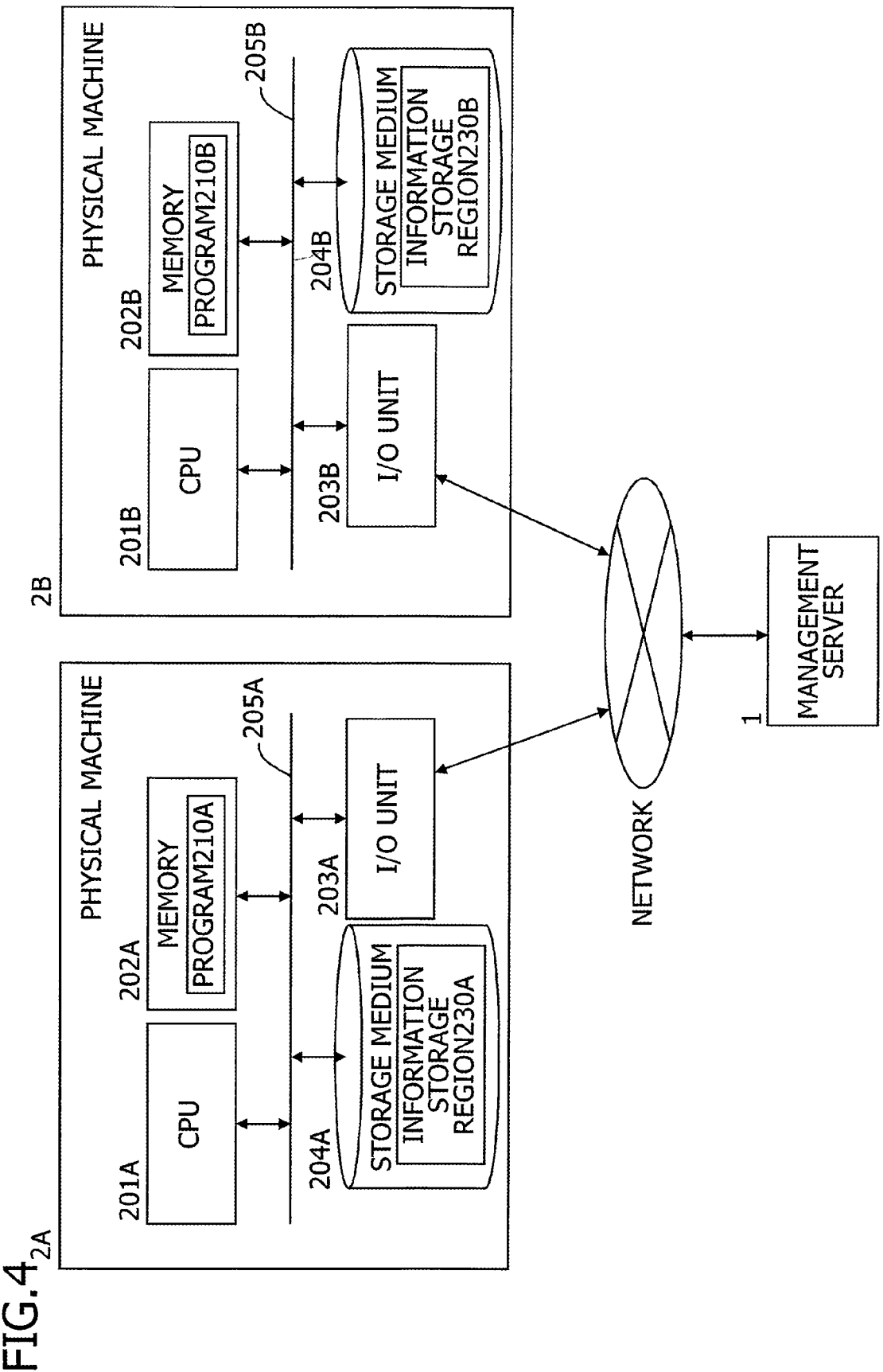
FIG. 4 is a diagram illustrating the hardware configuration of a physical machine.

Next, the configuration of the physical machines 2A, 2B will be explained. FIG. 4 is a diagram illustrating the hardware configuration of a physical machine. The physical machine 2A (also called "first physical machine 2A" below) has a CPU 201A, which is a processor, a memory 202A, an external interface (I/O unit) 203A, and a storage medium 204A. These respective parts are connected to each other via a bus 205A. The storage medium 204A stores a program 210A for carrying out processing for sharing information between the physical machine 2A and the physical machine 2B (called "information sharing process" below), in a program storage region (not illustrated) in the storage medium 204A, for example. The CPU 201A, as illustrated in FIG. 4, loads the program 210A to the memory 202A from the storage medium 204A, each time the program 210A is executed, and carries out an information sharing process in collaboration with the program 210A. Furthermore, the storage medium 204A has, for example, an information storage region 230A (also called "storage unit 230A" below) which stores information used when carrying out the information sharing process.

Moreover, the physical machine 2B (also called the "second physical machine 2B" below) has, similarly to the physical machine 2A, a CPU 201B which is a processor, a memory 202B, an external interface (I/O unit) 203B and a storage medium 204B. These parts are connected to each other via a bus 205B. The storage medium 204B stores a program 210B for carrying out the information sharing process, in a program storage region (not illustrated) in the storage medium 204B. As illustrated in FIG. 4, the CPU 201B loads the program 210B from the storage medium 204B to the memory 202B, each time the program 210B is executed, and carries out the information sharing process in collaboration with the program 210B. Moreover, the storage medium 204B has an information storage region 230B (also called "storage unit 230B" below) which stores information used when carrying out the information sharing process.

(Functions of Physical Machine)

Figure 5:
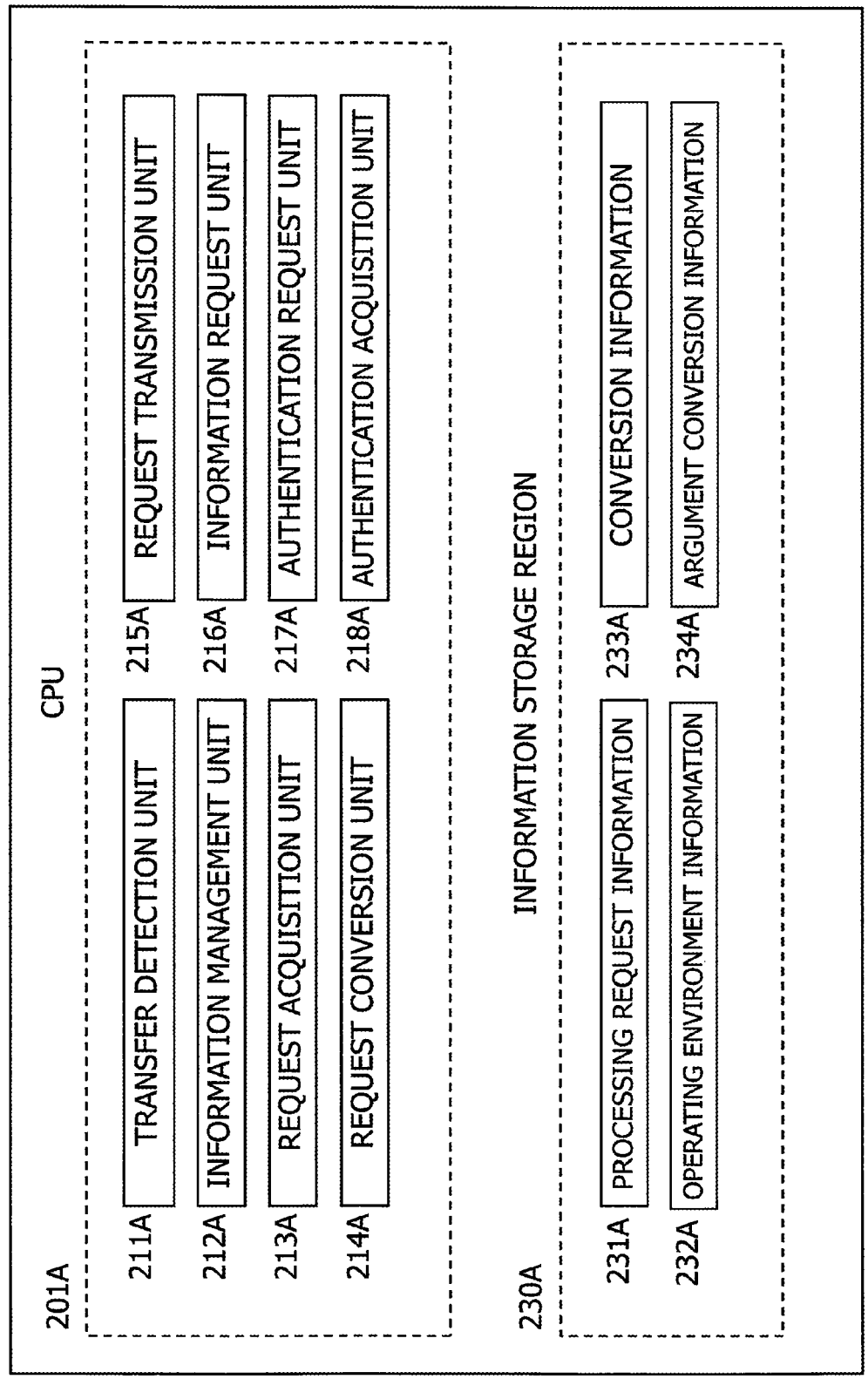
FIG. 5 is a functional block diagram of the physical machine in FIG. 4.
Figure 6:
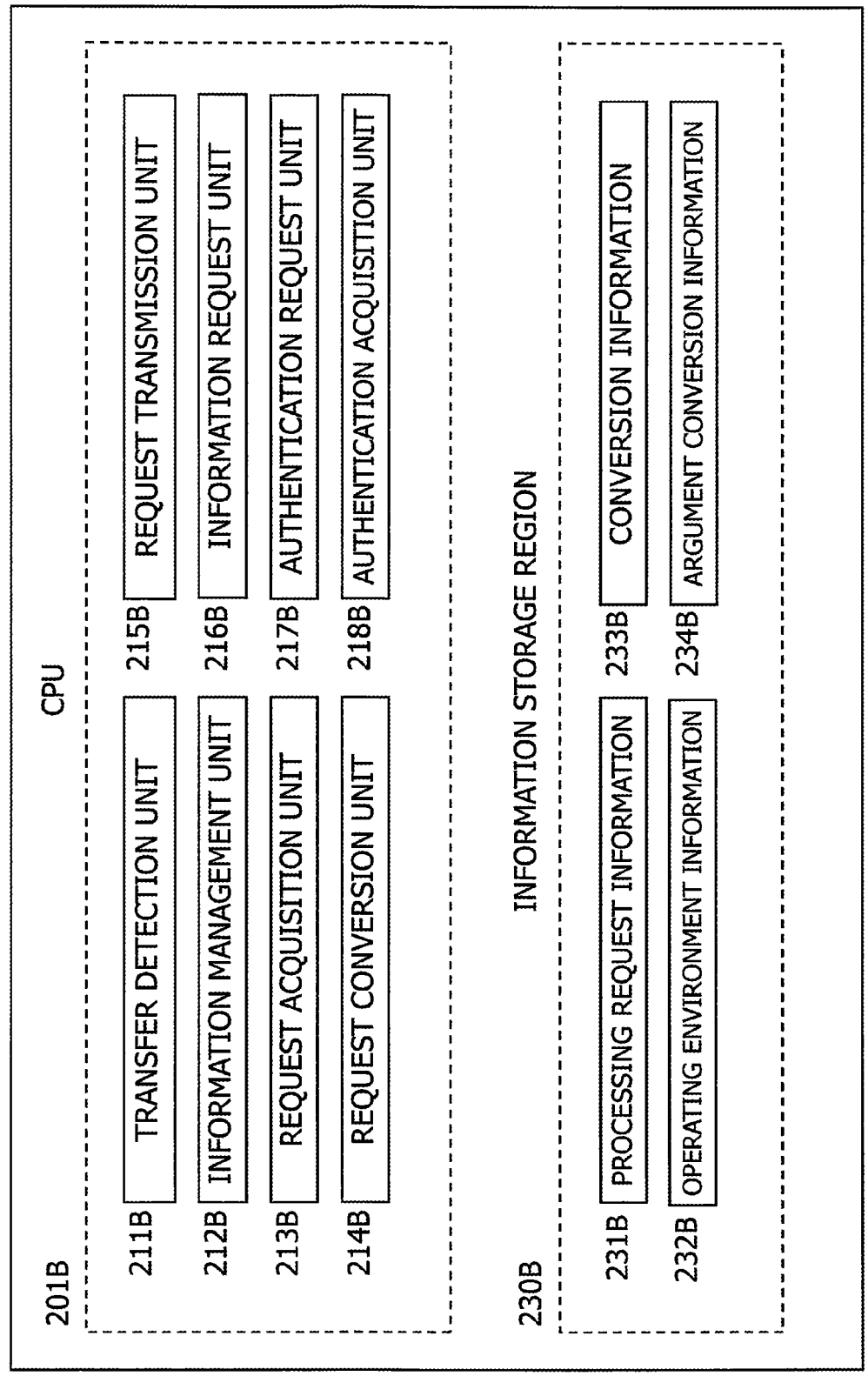
FIG. 6 is a functional block diagram of the physical machine in FIG. 4.

FIG. 5 and FIG. 6 are functional block diagrams of the physical machine in FIG. 4. The CPU 201A of the physical machine 2A, by operating in collaboration with the program 210A, operates as a transfer detection unit 211A, an information storage unit 212A, a request acquisition unit 213A, a request conversion unit 214A, and a request transmission unit 215A, for example. Furthermore, the CPU 201A, by operating in collaboration with the program 210A, operates as an information request unit 216A, an authentication request unit 217A, and an authentication acquisition unit 218A, for example. Moreover, processing request information 231A (also called "first processing request information 231A" below), operating environment information 232A (also called "first operating environment information 232A" below), conversion information 233A and argument conversion information 234A are stored in the information storage region 230A. Below, the transfer detection unit 211A, the information management unit 212A, the request acquisition unit 213A, the request conversion unit 214A, the request transmission unit 215A, the information request unit 216A, the authentication request unit 217A and the authentication acquisition unit 218A are jointly called a "conversion unit 220A".

Furthermore, the CPU 201B of the physical machine 2B, by operating in collaboration with the program 210B, operates as a transfer detection unit 211B, an information management unit 212B, a request acquisition unit 213B, a request conversion unit 214B, and a request transmission unit 215B, for example. Furthermore, the CPU 201B, by operating in collaboration with the program 210B, operates as an information request unit 216B, an authentication request unit 217B, and an authentication acquisition unit 218B, for example. Moreover, processing request information 231B (also called "second processing request information 231B" below), operating environment information 232B (also called "second operating environment information 232B" below), conversion information 233B and argument conversion information 234B are stored in the information storage region 230B. Below, the transfer detection unit 211B, the information management unit 212B, the request acquisition unit 213B, the request conversion unit 214B, the request transmission unit 215B, the information request unit 216B, the authentication request unit 217B and the authentication acquisition unit 218B are jointly called a "conversion unit 220B".

(Functions of Transfer Detection Unit and Information Management Unit)

The transfer detection unit 211A of the physical machine 2A detects when a virtual machine has been transferred to the physical machine 2A from another virtual machine, for example.

The information management unit 212A of the physical machine 2A stores, in the information storage region 230A, the processing request information 231A for carrying out a processing request in respect of the first processing unit 21A operating on the physical machine 2A, from the virtual machine (the application running on the virtual machine) which is operating on the physical machine 2A, for example. More specifically, when the processing request information 231A has been input from the user, for example, the information management unit 212A stores the input processing request information 231A in the information storage region 230A. The processing request information 231A may include authentication information (for example, a user name and password) in order for the first processing unit 21A to carry out authentication in respect of the virtual machine (or the user of the virtual machine). Furthermore, the processing request information 231A may include argument information for requesting processing of the first processing unit 21A, for example. The details of the processing request information 231A are described hereinafter. Furthermore, the argument conversion information 234A for carrying out conversion of the argument information is described hereinafter.

Furthermore, the information management unit 212A stores, for example, conversion information 233A including the processing request information 231A, the operating environment information 232A relating to the operating environment of the physical machine 2A, and the operating environment information 232B relating to the operating environment of the physical machine 2B. The operating environment information 232A is information corresponding to the processing request information 231A, for example, and may be identification information 232A which enables the physical machine 2A to identify the type of the processing request information 231A. Furthermore, the operating environment information 232B is information corresponding to the processing request information 231B, for example, and may be identification information 232B which enables the physical machine 2B to identify the type of the processing request information 231B. Moreover, when creating the conversion information 233A, the information management unit 212A associates the operating environment information 232A and the operating environment information 232B which have information of the same contents. Consequently, the physical machine 2A or the physical machine 2B is able to convert the processing request information 231A into processing request information 231B corresponding to the operating environment information 232B which has the same contents as the operating environment information 232A corresponding to the processing request information 231A. Specific examples of the operating environment information 232A, 232B and the conversion information 233A, 233B are described below.

Moreover, the information management unit 212A, for example, when the transfer detection unit 211A has detected the transfer of a virtual machine relating to the physical machine 2A, acquires the conversion information stored in the transfer-source physical machine up to the completion of the transfer of the virtual machine. The information management unit 212A then stores the conversion information for the transfer-source physical machine, in the information storage region 230A, as conversion information 233A. Consequently, the physical machine 2A is able to acquire, cumulatively, the conversion information in respect of all of the physical machines on which the virtual machine being transferred has operated in the past.

The transfer detection unit 211B and the information management unit 212B of the physical machine 2B carry out the same processing as the transfer detection unit 211A and the information management unit 212B described above, and therefore description thereof is omitted here. Furthermore, the processing request information 231B and the argument conversion information 234B are the same as the processing request information 231A and the argument conversion information 234A, and therefore description thereof is omitted here.

(Functions of Request Acquisition Unit, Request Conversion Unit, Request Transmission Unit and Information Request Unit)

The request acquisition unit 213A of the physical machine 2A acquires processing request information sent to the first processing unit 21A by the virtual machine operating on the physical machine 2A, for example. In other words, when a virtual machine operating on the physical machine 2A is a virtual machine that has been transferred from another physical machine, then the processing request information acquired by the request acquisition unit 213A is processing request information which it is not clear that the first processing unit 21A can recognize.

The request conversion unit 214A of the physical machine 2A, for example, determines whether or not the conversion information 233A includes processing request information 231A which corresponds to the processing request information transmitted from the virtual machine operating on the physical machine 2A. In other words, the request conversion unit 214A determines whether or not processing request information 231A which has the same contents as the processing request information acquired by the request acquisition unit 213A and which can be processed by the first processing unit 21A is included in (is present in) the conversion information 233A. If the conversion information 233A includes processing request information 231A corresponding to the processing request information acquired by the request acquisition unit 213A, then the request conversion unit 214A instructs the request transmission unit 215A to transmit the processing request information 231A that was included in the conversion information 233A, to the first processing unit 21A. On the other hand, if the conversion information 233A does not include processing request information 231A corresponding to the processing request information acquired by the request acquisition unit 213A, then the information request unit 216A of the physical machine 2A requests the input of processing request information 231A, by the user of the virtual machine operating on the physical machine 2A. Consequently, the request conversion unit 214A is able to send processing request information 231A which has the same contents as the processing request information acquired by the request acquisition unit 213A and which can be processed by the first processing unit 21A, to the first processing unit 21A. Moreover, if the processing request information 231A is included in the conversion information 233A, then the physical machine 2A can send the processing request information 231 to the first processing unit 21A, without requesting the processing request information 231A from the user of the virtual machine. Therefore, it is possible to prevent the interruption of the services provided to the user by the physical machine 2A, even in the case of the transfer of a virtual machine.

The request transmission unit 215A of the physical machine 2A sends the processing request information 231A to the first processing unit 21A, on the basis of an instruction from the request conversion unit 214A, for example.

The request acquisition unit 213B, the request conversion unit 214B, the request transmission unit 215B and the information request unit 216B of the physical machine 2B carry out the same processing as the request acquisition unit 213A, the request conversion unit 214A, the request transmission unit 215A and the information request unit 216A described above, and therefore description thereof is omitted here.

(Functions of Authentication Request Unit and Authentication Acquisition Unit)

The authentication request unit 217A of the physical machine 2A, for example, sends authentication information included in the processing request information 231A acquired by the request acquisition unit 213A, to the first processing unit 21A, and requests execution of authentication processing, by the first processing unit 21A.

The authentication acquisition unit 218A of the physical machine 2A, for example, acquires authentication key information (also called simply "authentication key" below) sent by the first processing unit 21A. The authentication key is described hereinafter. Furthermore, specific examples of the processing of the authentication request unit 217A and the authentication acquisition unit 218A are also described hereinafter. The authentication request unit 217B and the authentication acquisition unit 218B of the physical machine 2B carry out similar processing to the authentication request unit 217A and the authentication acquisition unit 218A and therefore description thereof is omitted here.

First Embodiment

Figure 7:
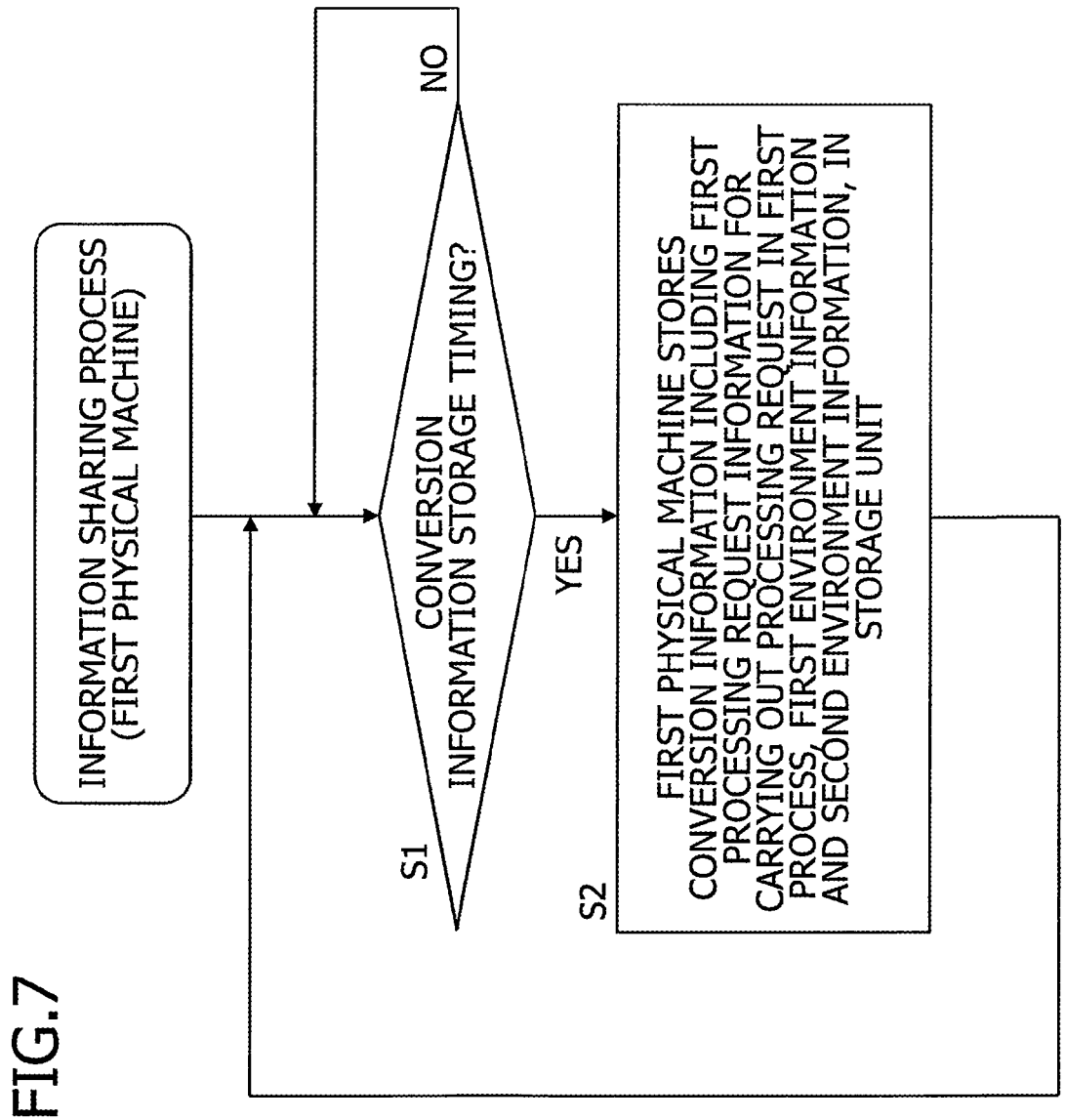
FIG. 7 is a flowchart diagram illustrating an overview of an information sharing process according to the first embodiment.
Figure 8:
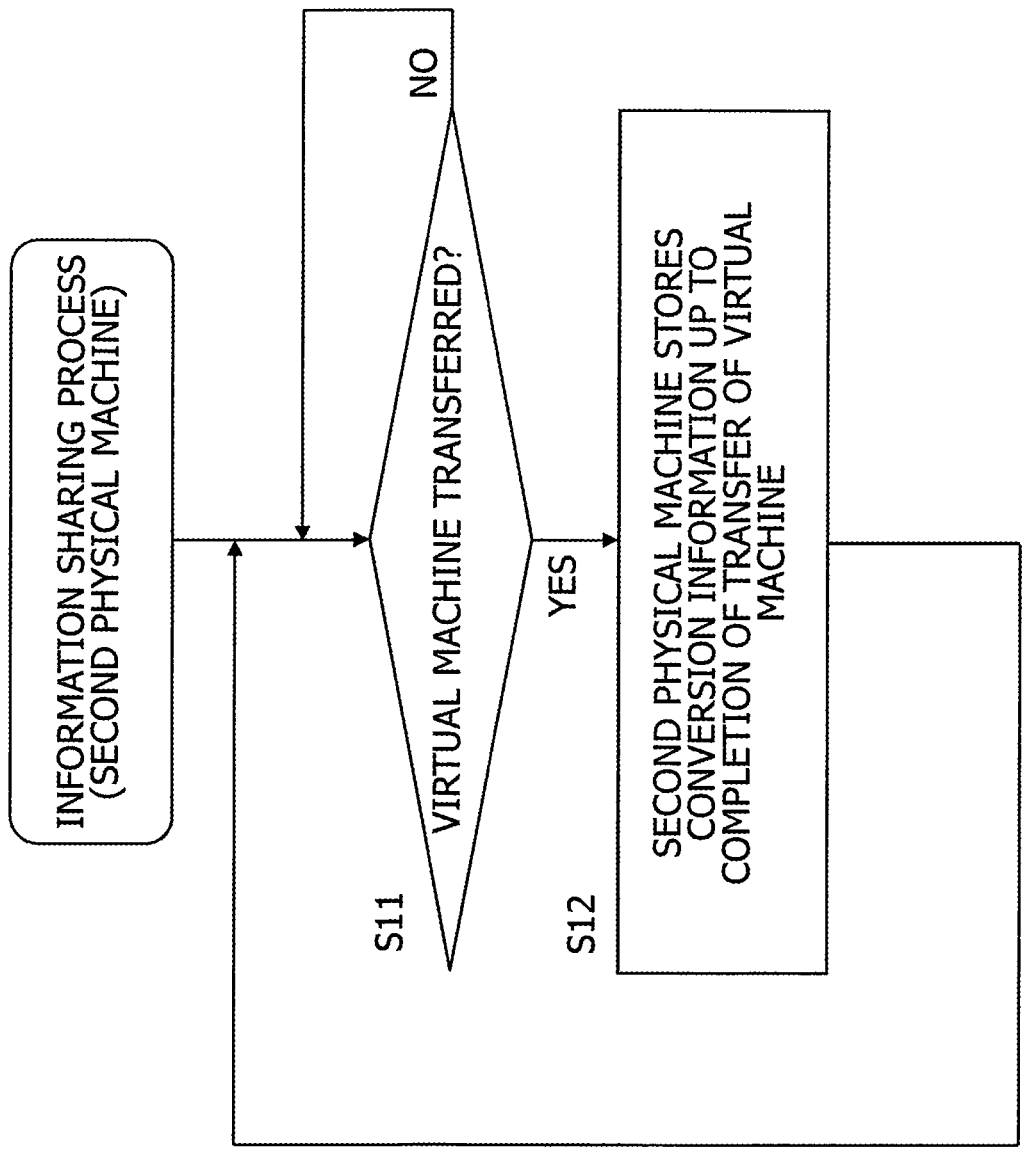
FIG. 8 is a flowchart diagram illustrating an overview of an information sharing process according to the first embodiment.
Figure 9:
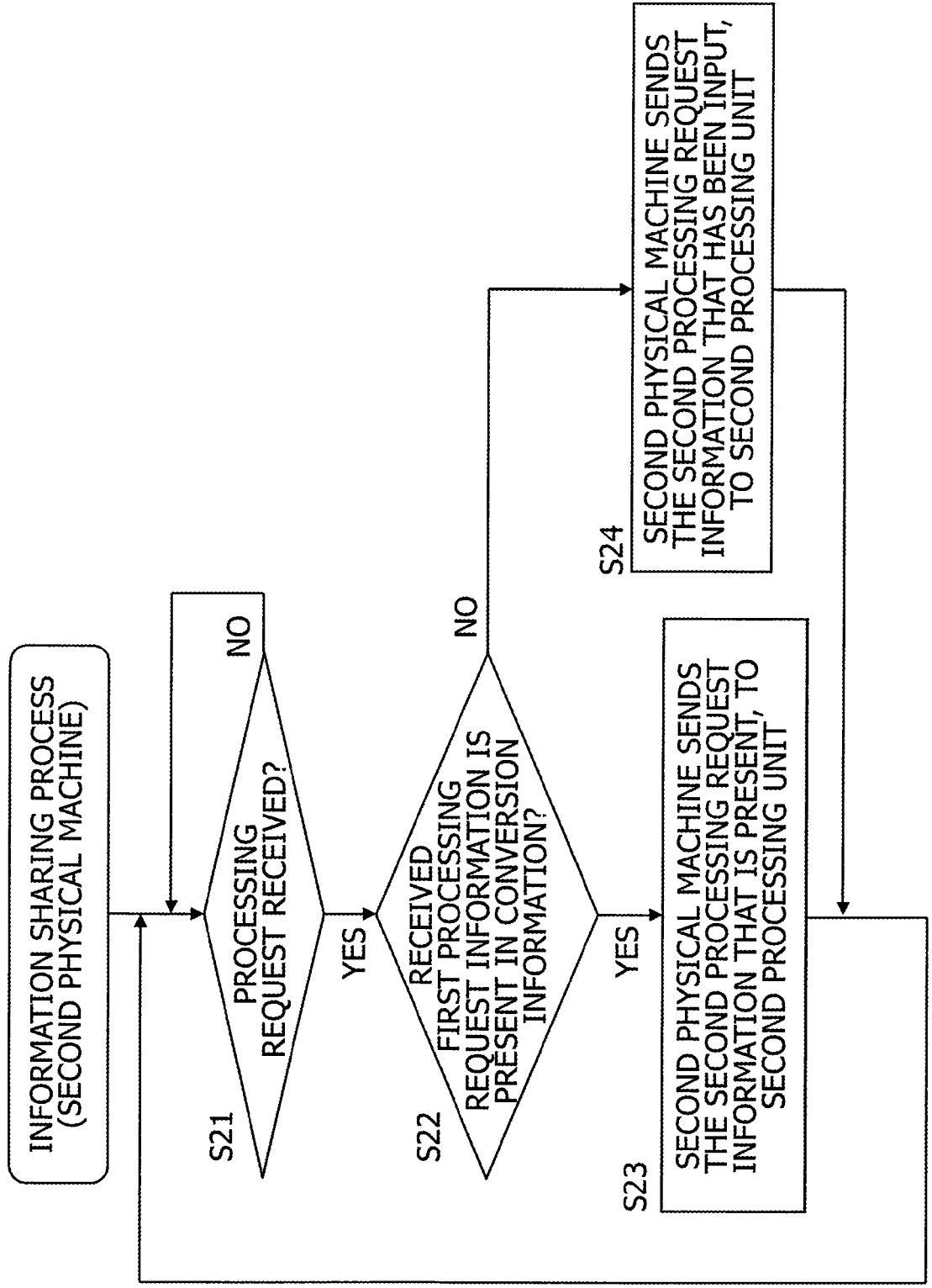
FIG. 9 is a flowchart diagram illustrating an overview of an information sharing process according to the first embodiment.
Figure 10:
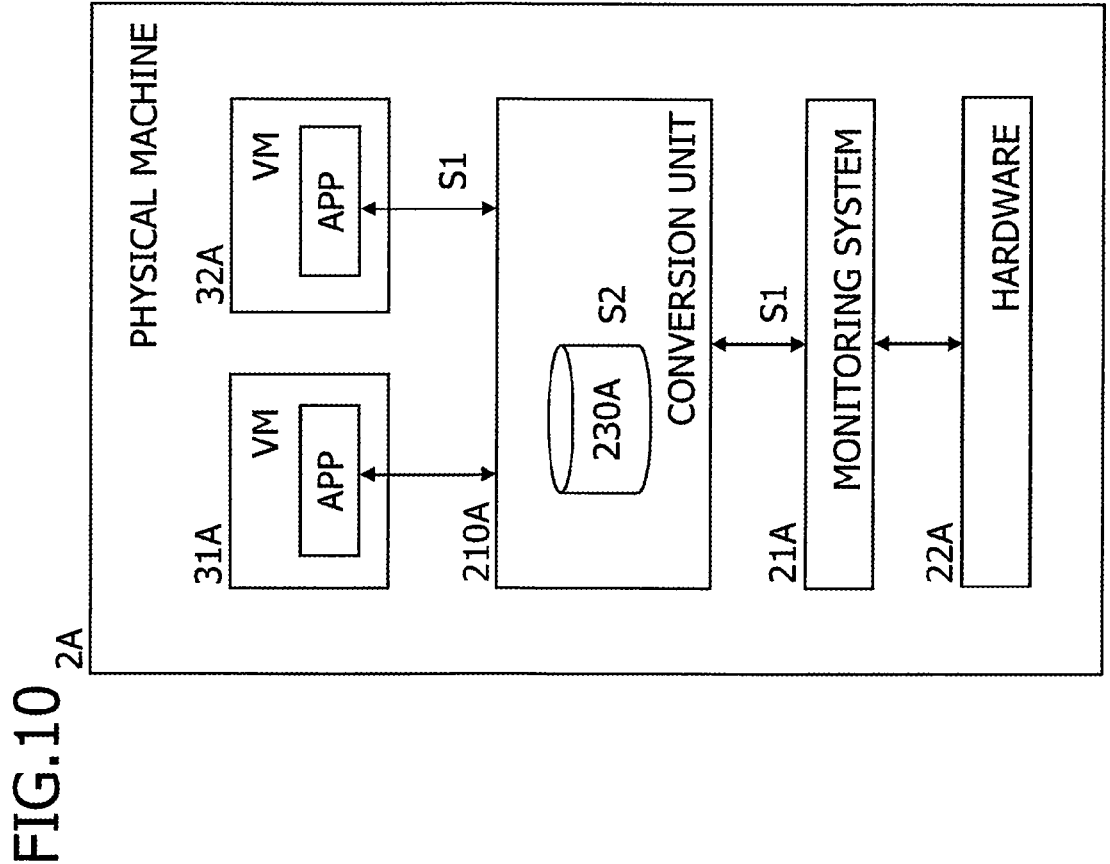
FIG. 10 is a diagram illustrating an overview of an information sharing process according to the first embodiment.
Figure 11:
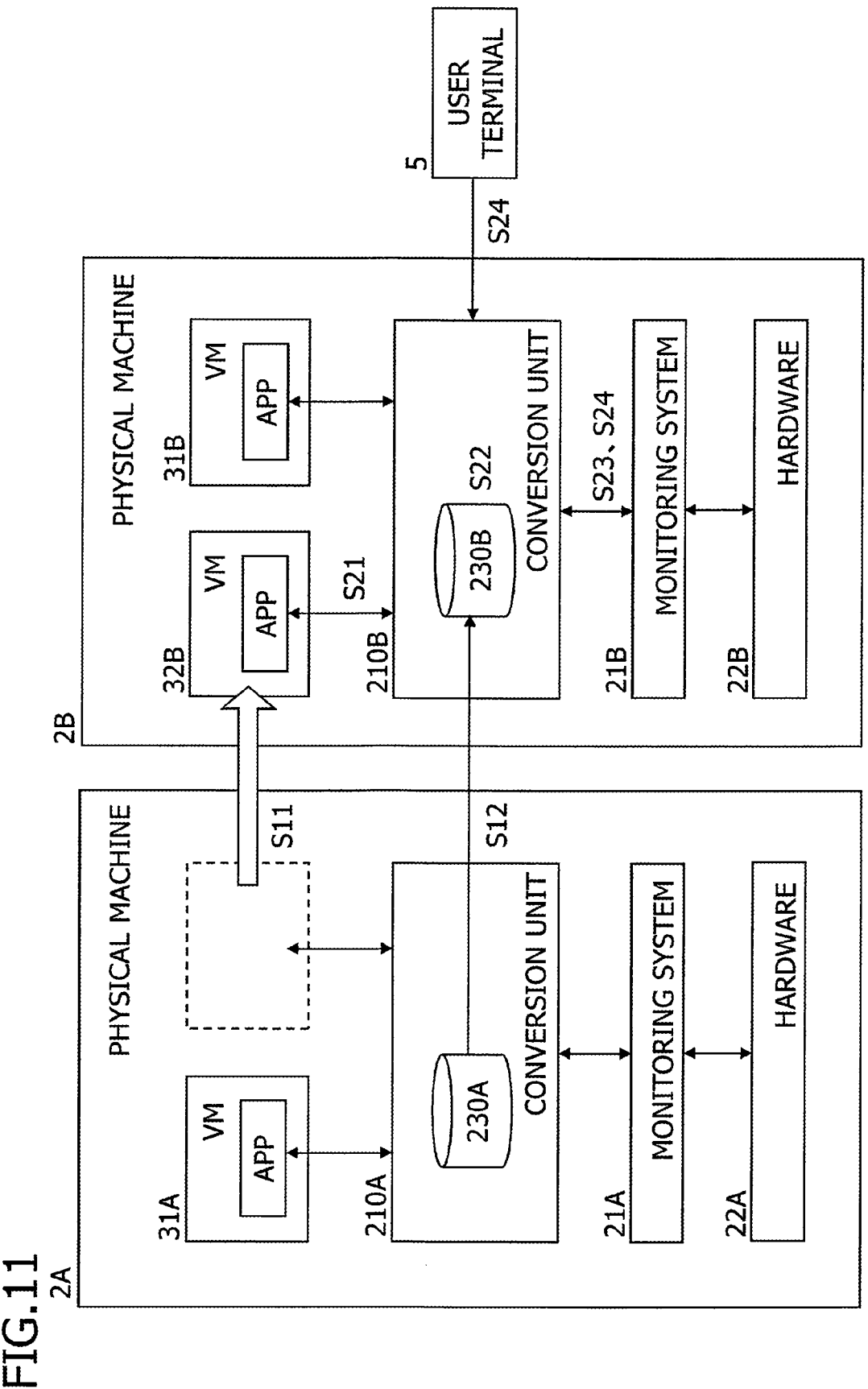
FIG. 11 is a diagram illustrating an overview of an information sharing process according to the first embodiment.

Next, a first embodiment will be described. FIG. 7 to FIG. 9 are flowchart diagrams illustrating an overview of an information sharing process according to the first embodiment. Furthermore, FIG. 10 and FIG. 11 are diagrams illustrating an overview of an information sharing process according to the first embodiment. An overview of the information sharing process in FIG. 7 to FIG. 9 is described here with reference to FIG. 10 and FIG. 11. A case where a virtual machine operating on the physical machine 2A is transferred to the physical machine 2B will be described below. The points of difference between FIG. 10 and FIG. 11, and FIG. 2 and FIG. 3, will be described.

Firstly, the processing in the physical machine 2A (the conversion unit 220A of the physical machine 2A) will be described. As illustrated in FIG. 7 and FIG. 10, the physical machine 2A waits until the timing at which conversion information 233A is stored, for example (NO at S1). The timing at which conversion information 233A is stored is, for example, when the virtual machine operating on the physical machine 2A has sent the processing request information 231A to the first processing unit 21A. When the timing for storing conversion information 233A is reached (YES at S1), the physical machine 2A creates conversion information 233A including the processing request information 231A sent from the virtual machine operating on the physical machine 2A, the operating environment information 232A, and the operating environment information 232B. The physical machine 2A then stores the created conversion information 233A in the storage unit 230A (S2). In other words, the physical machine 2A, for example, accumulates and stores the conversion information 233A in the information storage region 230A, in accordance with the sending of the processing request information 231A to the first processing unit 21A from the virtual machine operating on the physical machine 2A. The operating environment information 232A and the operating environment information 232B may be stored previously in the information storage region 230A. Furthermore, the operator may previously store conversion information 233A including the processing request information 231A, in the storage unit 230A, before sending the processing request information 231A to the first processing unit 21A.

Next, the processing in the physical machine 2B (the conversion unit 220B of the physical machine 2B) will be described. As illustrated in FIG. 8 and FIG. 11, the physical machine 2B waits, for example, for the transfer of a virtual machine to the physical machine 2B to be carried out (NO at S11). When a virtual machine operated on the physical machine 2A is transferred to the physical machine 2B for example (YES at S11), then the physical machine 2B holds the conversion information 233A stored in the storage unit 230A of the physical machine 2A (S12). More specifically, the physical machine 2B may access the storage unit 230A, for example, to acquire the conversion information 233A, and to store same in the storage unit 230B as conversion information 233B. Furthermore, the physical machine 2B may receive the conversion information 233A sent from the physical machine 2A and store same in the information storage region 230B as conversion information 233B.

Consequently, the physical machine 2B is able to refer to the conversion information 233B when the virtual machine that has been transferred from the physical machine 2A to the physical machine 2B, sends the processing request information 231A to the second processing unit 21B. The physical machine 2B, by referring to the conversion information 233B, is able to acquire processing request information 231B corresponding to the operating environment information 232B having the same contents as the operating environment information 232A corresponding to the processing request information 231A of the transferred virtual machine. Therefore, the physical machine 2B can determine whether or not the processing request information 231B corresponding to the processing request information 231A of the virtual machine is present in the conversion information 233B.

The physical machine 2B may acquire a conversion module for operating the conversion unit 220A (for example, a portion of the program 210A illustrated in FIG. 4), jointly when acquiring the conversion information 233A from the physical machine 2A. The physical machine 2B may operate as a conversion unit 220B by running the acquired conversion module in collaboration with the CPU. Furthermore, the physical machine 2A may store the conversion module and the conversion information 233A in a different physical machine to the physical machine 2A. Furthermore, if the conversion information 233A includes information relating to three or more physical machines, then the physical machine 2B may acquire only the information relating to the physical machine 2A and the physical machine 2B, from among the conversion information 233A. Similarly, if the conversion information 233A includes information relating to three or more physical machines, then the physical machine 2B may acquire only a conversion module for converting the processing request information 231A and the processing request information 231B.

Thereafter, as illustrated in FIG. 9 and FIG. 11, the physical machine 2B waits for the processing request information 231A to be sent to the second processing unit 21B from the virtual machine that has been transferred from the physical machine 2A (NO at S21). When the processing request information 231A has been sent from the transferred virtual machine (YES at S21), then the physical machine 2B, for example, refers to the conversion information 233B, and determines whether or not processing request information 231B corresponding to the sent processing request information 231A is present (S22). More specifically, the second processing unit 21B cannot recognise the processing request information 231A sent by the virtual machine 32A and therefore cannot carry out processing based on the processing request information 231A. Consequently, the physical machine 2B acquires (traps) the processing request information 231A sent by the virtual machine 32A, and if the processing request information 231B is present in the conversion information 233B, converts the processing request information 231A into processing request information 231B that can be processed by the second processing unit 21B.

Thereupon, if processing request information 231B corresponding to the processing request information 231A is present (YES at S22), then the physical machine 2B, for example, sends the processing request information 231B to the second processing unit 21B (S23). In other words, in this case, the physical machine 2B, by referring to the conversion information 233B, is able to automatically convert the processing request information 231A sent by the transferred virtual machine 32A into the processing request information 231B. Therefore, the physical machine 2B, in this case, does not need to request the input of information required in order to carry out the processing request in the second processing unit 21B.

On the other hand, if the processing request information 231B corresponding to the processing request information 231A is not present (NO at S22), then the physical machine 2B, for example, requests input of the processing request information 231B, by the user of the virtual machine. As illustrated in FIG. 11, for instance, when the corresponding processing request information 231B is input by the user via the user terminal 5, then the physical machine 2B sends the input processing request information 231B to the second processing unit 21B (S24).

In this way, according to the first embodiment, firstly, the physical machine 2A stores conversion information 233A including the processing request information 231A for carrying out the processing request in the first processing unit 21A which is operating on the physical machine 2A, and the operating environment information 232A and the operating environment information 232B, in the storage unit 230A. The physical machine 2B then holds the conversion information 233A (conversion information 233B) in accordance with the transfer of the virtual machine from the first physical machine 2A to the second physical machine 2B. Thereby, the physical machine 2B is able to determine whether or not processing request information 231B corresponding to the processing request information 231A sent by the virtual machine 32A is present in the conversion information 233B.

According to the first embodiment, the physical machine 2B refers to the conversion information 233B when a virtual machine that has been transferred sends processing request information 231A and issues a processing request to the second processing unit 21B. Subsequently, the physical machine 2B determines whether or not processing request information 231B corresponding to the operating environment information 232B which has the same contents as the operating environment information 232A corresponding to the processing request information 231A of the transferred virtual machine is present in the conversion information 233B. If, as a result of this, the corresponding processing request information 231B is present, then the physical machine 2B sends the processing request information 231B in the conversion information 233B, to the second processing unit 21B. On the other hand, if the corresponding processing request information 231B is not present, then the physical machine 2B, after input of the processing request information 231B that was not present, sends the processing request information 231B that has been input, to the second processing unit 21B. Thereby, if the processing request information 231B corresponding to the processing request information 231A sent by the transferred virtual machine is present in the conversion information 233B, then the operator does not need to set the processing request information 231B in association with the transfer of the virtual machine. Consequently, in this case, the operator is able to prevent the interruption of services in association with the transfer of the virtual machine.

The physical machine 2B, upon receiving processing results (hereinafter also called a response) relating to the processing request information 231A sent by the virtual machine which has transferred to the physical machine 2B, may send the processing results to the virtual machine that issued the processing request. In this case, for example, if the physical machine 2B has converted the processing request information 231A into the processing request information 231B and sent this information to the second processing unit 21B, then the physical machine 2B refers to the conversion information 233B. The physical machine 2B may send the received processing results after reconverting to information that can be recognized by the virtual machine which sent the processing request information 231A. Thereby, the transferred virtual machine (the application of the transferred virtual machine) is able to recognise the response from the second processing unit 21B, even if there is a difference between the processing request information 231A sent by the virtual machine, and the processing request information 231B that has actually been processed by the second processing unit 21B.

(Details of First Embodiment)

Next, the details of the first embodiment will be described. FIG. 12 to FIG. 16 are flowchart diagrams illustrating the details of an information sharing process according to the first embodiment. Furthermore, FIG. 17 to FIG. 22 are diagrams illustrating the details of an information sharing process according to the first embodiment. The details of the information sharing process illustrated in FIG. 12 to FIG. 16 are described with reference to FIG. 17 to FIG. 22. Below, the processing request information 231A is described as including authentication information 241A for the first processing unit 21A to carry out authentication of the virtual machine, and argument information 242A which is an argument for requesting specific processing to the first processing unit 21A. Similarly, the processing request information 231B is described as including authentication information 241B and argument information 242B.

(Processing in First Physical Machine)

Figure 12:
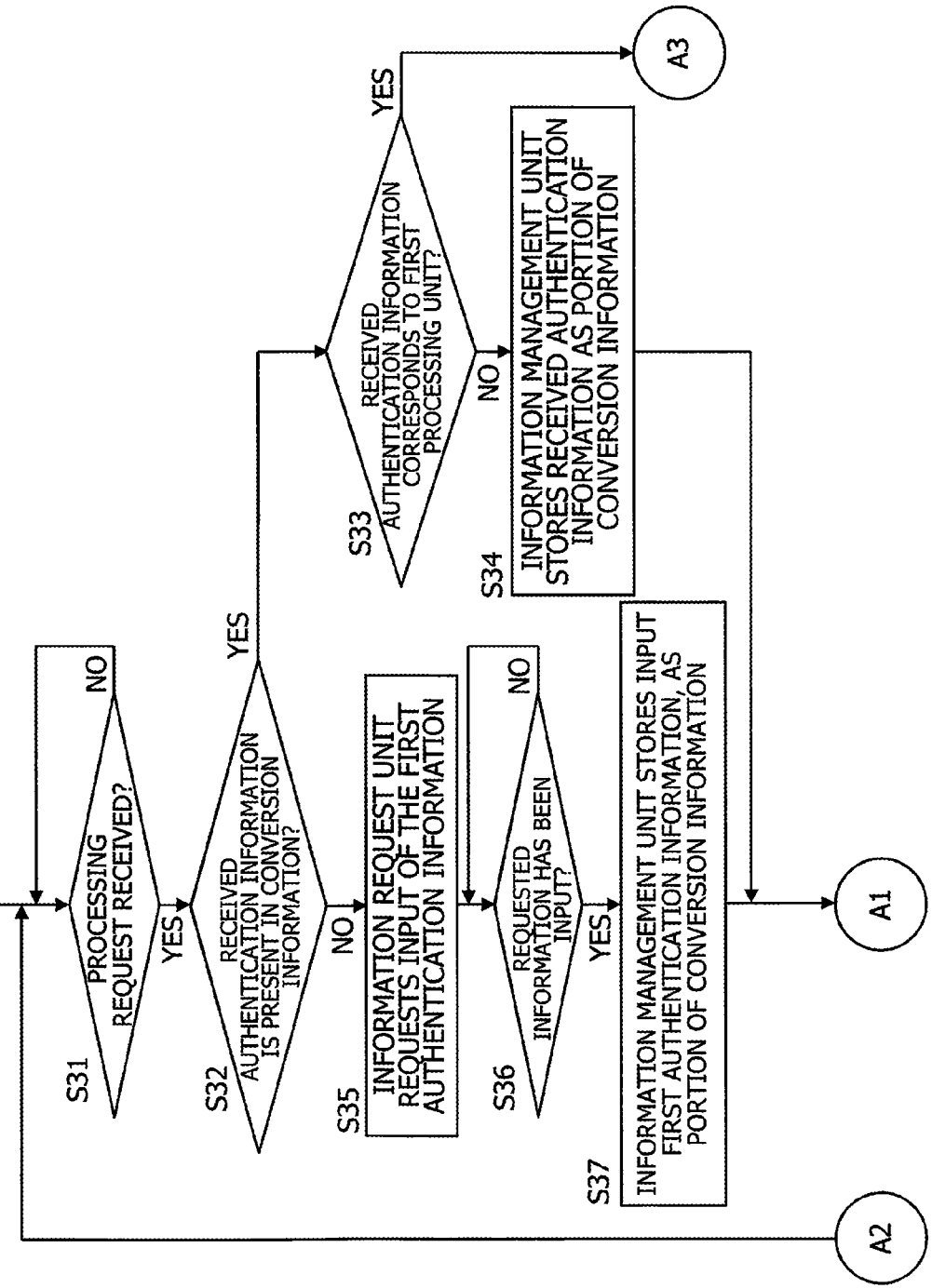
FIG. 12 is a flowchart diagrams illustrating the details of an information sharing process according to the first embodiment.
Figure 13:
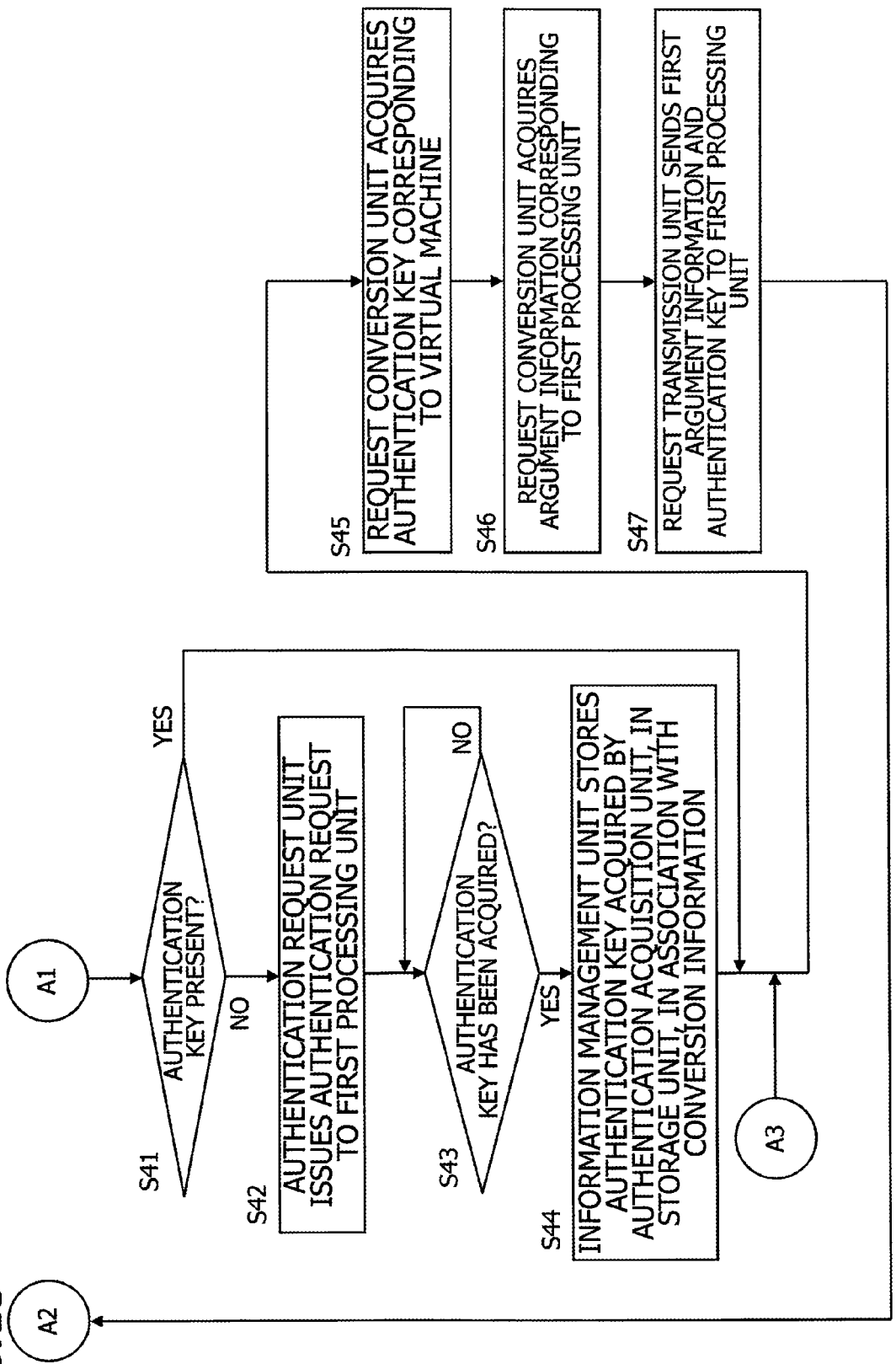
FIG. 13 is a flowchart diagrams illustrating the details of an information sharing process according to the first embodiment.

Firstly, as illustrated in FIG. 12, the request acquisition unit 213A of the physical machine 2A waits for processing request information 231A relating to the first processing unit 21A to be sent from the virtual machine which is operating on the physical machine 2A, for example (NO at S31). When processing request information is sent from the virtual machine operating on the physical machine 2A (YES at S31), then the request acquisition unit 213A traps the processing request information that has been sent. More specifically, the request acquisition unit 213A receives all of the processing request information sent from the virtual machines operating on the physical machine 2A. Thereby, the request conversion unit 214A becomes able to determine whether or not conversion is required (whether or not the acquired processing request information is the processing request information 231A), in respect of all of the processing request information acquired by the processing acquisition unit 213A.

Next, the request conversion unit 214A of the physical machine 2A determines whether or not the authentication information contained in the processing request information acquired by the request acquisition unit 213A is present in the conversion information 233A stored in the information storage region 230A (S32). The authentication information is, for example, information for the first processing unit 21A, etc. to carry out authentication of the virtual machine. More specifically, the authentication information may include a user name and password. If the first processing unit 21A, etc. has carried out authentication of the virtual machine, then as described hereinafter, the information management unit 212A stores the authentication information used for this authentication in the information storage region 230A as a portion of the conversion information 233A. Therefore, the request conversion unit 214A is able to determine whether or not the virtual machine that sent the processing request information is a virtual machine that has already been authenticated by the first processing unit 21A, by determining whether or not the authentication information acquired by the request acquisition unit 213A is present in the conversion information 233A.

If the authentication information contained in the processing request information acquired by the request acquisition unit 213A is present in the conversion information 233A (YES at S32), then the request conversion unit 214A, for example, may determine whether or not the acquired authentication information is authentication information 241A corresponding to the first processing unit 21A (S33). If, as a result of this, the acquired authentication information is not authentication information 241A corresponding to the first processing unit 21A (NO at S33), then the information management unit 212A, for example, may store the acquired authentication information in the information storage region 230A as a portion of the conversion information 233A (S34). In other words, a case where the acquired authentication information is not the authentication information 241A corresponding to the first processing unit 21A is a case where the conversion information 233A contains other authentication information (authentication information for a processing unit operating on another physical machine, etc.), which has the same contents as the authentication information 241A for which a processing request has been made of the first processing unit 21A. In this case, the request conversion unit 214A may determine that the acquired authentication information is authentication information 241A corresponding to the first processing unit 21A, on the basis of the fact that other authentication information is present in the conversion information 233A. Thereby, the request conversion unit 214A is able to restrict the frequency with which the user is requested to input authentication information 241A.

On the other hand, if the authentication information contained in the processing request information acquired by the request acquisition unit 213A is not present in the conversion information 233A (NO at S32), then the information request unit 216A, for example, requests the input of authentication information 241A corresponding to the first processing unit 21A (S35). Thereafter, the information request unit 216A, for example, waits for the input of the authentication information 241A of which the input has been requested (NO at S36). If there is an input of authentication information 241A (YES at S36), then the information management unit 212A stores the input authentication information 241A in the information storage region 230A as a portion of the conversion information 233A (S37). A concrete example of the conversion information 233A is described below.

FIG. 17 is a concrete example of the conversion information 233A. The conversion information 233A illustrated in FIG. 17 includes, as items, a "process name" which identifies the monitoring system, etc. running on each physical machine, and "metadata" which identifies the respective information managed by the conversion information 233A. Furthermore, the conversion information 233A illustrated in FIG. 17 includes, as items, "operating environment information" which identifies information corresponding to metadata in each of the processing units, and "authentication information" which is authentication information set for each element of operating environment information.

More specifically, in the conversion information 233A illustrated in FIG. 17, "MON-A", "MON-B" and "MON-C" are set as the "process name". Furthermore, in the conversion information 233A illustrated in FIG. 17, "user name", "password" and "authentication key" are set as "metadata". The authentication key is described hereinafter. Furthermore, in the conversion information 233A illustrated in FIG. 17, in the "operating environment information" corresponding to the "user name", "User" is set for "MON-A", "Login" is set for "MON-B", and "User" is set for "MON-C".

The information set in the "operating environment information" illustrated in FIG. 17 is set already in the conversion information 233A, before the request acquisition unit 213A acquires the processing request information 231A. Therefore, each physical machine is able to make a processing request to each of the processing units, corresponding to the differences in the names, etc. of the information elements required in each processing unit. More specifically, for example, the "password" in the "metadata" of FIG. 17 is represented as "Password" in "MON-A" and "MON-C", but is represented as "PWD" in "MON-B". The other information in FIG. 17 is not described here.

FIG. 18 is an example of conversion information 233A illustrating a case where authentication information 241A (user name and password) corresponding to the first processing unit 21A is stored in S34 or S37, after the state illustrated in FIG. 17. Below, an example is described where the information is stored in S34. Furthermore, in the following description, it is supposed that the first processing unit 21A and the MON-A are mutually corresponding.

More specifically, information corresponding to a user name and password for executing MON-A is not set in the conversion information 233A illustrated in FIG. 17 (NO at S32). Therefore, as illustrated in FIG. 18, the information management unit 212A sets the user name and password included in the input processing request information (S35, YES at S36, S37). More specifically, in the example illustrated in FIG. 18, the information management unit 212A sets "A531", which is the input user name, in the "authentication information" corresponding to the information of which the "process name" is "MON-A" and the "metadata" is "user name". As illustrated in FIG. 18, the information management unit 212A sets the input password "1234" in the "authentication information" corresponding to the information of which the "process name" is "MON-A" and the "metadata" is "password". Consequently, after the state in FIG. 18, when the processing request information 231A is sent again from the virtual machine operating on the physical machine 2A, the request conversion unit 214A does not need to set the processing request information 231A that has been sent.

The virtual machine operating on the physical machine 2A may send the processing request information 231A which includes the operating environment information illustrated in FIG. 18, etc. More specifically, the virtual machine which is running on the physical machine 2A sends the processing request information 231A in a state in which, for example, "User", which is in the operating environment information, is associated with "A531", which is in the authentication information, and in which "Password", which is in the operating environment information, is associated with "1234", which is in the authentication information. Therefore, the request conversion unit 214A, in S32, is able to determine whether or not the authentication information contained in the processing request information acquired by the request acquisition unit 213A is present in the conversion information 233A.

Returning to FIG. 13, the authentication request unit 217A of the physical machine 2A, for example, determines whether or not the conversion information 233A includes an authentication key corresponding to the first processing unit 21A (S41). The authentication key is, for example, information which is assigned to a virtual machine operating on the physical machine 2A by the first processing unit 21A, on the basis of the user name and password sent to the first processing unit 21A by the virtual machine.

If the authentication key corresponding to the first processing unit 21A is not present in the conversion information 233A (NO at S41), then the authentication request unit 217A of the physical machine 2A, for example, sends the user name and password included in the conversion information 233A to the first processing unit 21A, and issues an authentication request to the first processing unit 21A (S42). The authentication acquisition unit 218A of the physical machine 2A, for example, waits for the first processing unit 21A to send an authentication key (NO at S43). Thereafter, when the authentication acquisition unit 218A has acquired an authentication key (YES at S43), the information management unit 212A, for example, stores the acquired authentication key in the storage unit 230A in association with the conversion information 233A (S44). If the authentication acquisition unit 218A does not acquired an authentication key, then the authentication acquisition unit 218A may return to S35. On the other hand, if an authentication key corresponding to the first processing unit 21A is present in the conversion information 233A (YES at S33 or YES at S41), then the authentication request unit 217A does not carry out processing for acquiring the authentication key, etc. Accordingly, the authentication acquisition unit 218A is able to acquire an authentication key, when authentication by the authentication request unit 217A has been completed.

FIG. 19 is an example of conversion information 233A illustrating a case where an authentication key corresponding to MON-A has been stored (S44) after the state illustrated in FIG. 18. More specifically, as illustrated in FIG. 19, the information management unit 212A sets the authentication key "2b3kkdzi7", which is the authentication key acquired by the authentication acquisition unit 218A, in the "authentication information" corresponding to the information for which the "process name" is "MON-A" and the "metadata" is "authentication key".

Returning to FIG. 13, after S44, or a YES result in S33, the request conversion unit 214A, for example, acquires an authentication key corresponding to the first processing unit 21A from the information storage region 230A (S45). Furthermore, the request conversion unit 214A, for example, acquires argument information 242A corresponding to the argument information contained in the processing request information acquired by the request acquisition unit 213A by referring the argument conversion information 234A (S46). More specifically, the request conversion unit 214A converts not only the authentication information contained in the processing request information acquired by the request acquisition unit 213A but also the argument information in order that the first processing unit 21A is able to execute the processing request that has been issued by the virtual machine.

FIG. 20 is a diagram illustrating a concrete example of the argument conversion information 234A. The argument conversion information 234A illustrated in FIG. 20 includes, as items, the "process name" illustrated in FIG. 18, the "metadata" illustrated in FIG. 18, and "argument information" to which the argument information 242A is set. In the "metadata" of the example in FIG. 20, "CPU use information acquisition command" which acquires the use information of the CPU of each virtual machine, and "memory use information acquisition command" which acquires the use information of the memory of each virtual machine, are set. More specifically, in the argument conversion information 234A illustrated in FIG. 20, "AAA" is set in the "argument information" corresponding to the information for which the "process name" is "MON-A" and the "metadata" is "CPU use information acquisition command". The other information in FIG. 20 is not described here.

Returning to FIG. 13, the request transmission unit 215A sends the authentication key acquired by the request conversion unit 214A in S45, and the argument information 242A acquired by the request conversion unit 214A in S46 (S47). In other words, the request transmission unit 215A sends the authentication key jointly, when sending the argument information 242A to the first processing unit 21A. Thereby, the request transmission unit 215A is not required to send the user name and password, each time the argument information 242A is sent. In this case, it is possible to reduce the processing load on the first processing unit 21A, since it is not necessary to carry out an authentication process based on the user name and password, each time the argument information 242A is received.

(Processing when Virtual Machine has Transferred from First Physical Machine to Second Physical Machine)

Figure 14:
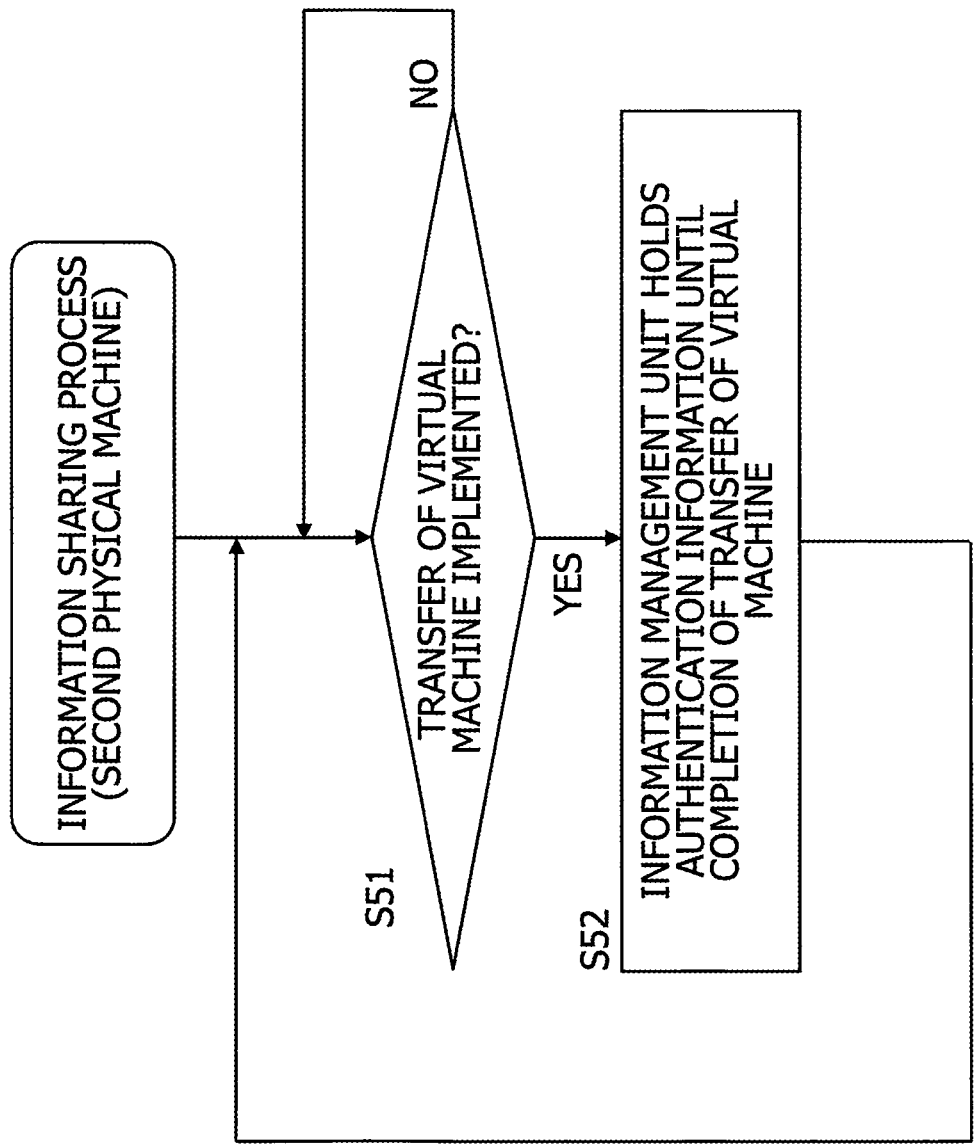
FIG. 14 is a flowchart diagrams illustrating the details of an information sharing process according to the first embodiment.

Next, the processing in a case where a virtual machine operating on the physical machine 2A is transferred to the physical machine 2B will be described. Firstly, the information management unit 212B of the physical machine 2B, as illustrated in FIG. 14, waits for the transfer of a virtual machine to the physical machine 2B, for example (NO at S51). When the virtual machine operating on the physical machine 2A is transferred to the physical machine 2B (YES at S51), then the physical machine 2B acquires and stores the conversion information 233A stored in the storage unit 230A of the physical machine 2A (S52). In other words, the information management unit 212B, in S34 and S37 of FIG. 12, and S44 of FIG. 13, acquires the conversion information 233A, which is information that has been stored by the information management unit 212A. Therefore, the information management unit 212B can acquire conversion information corresponding to each of the physical machines on which the transferred virtual machine has operated in the past.

Figure 15:
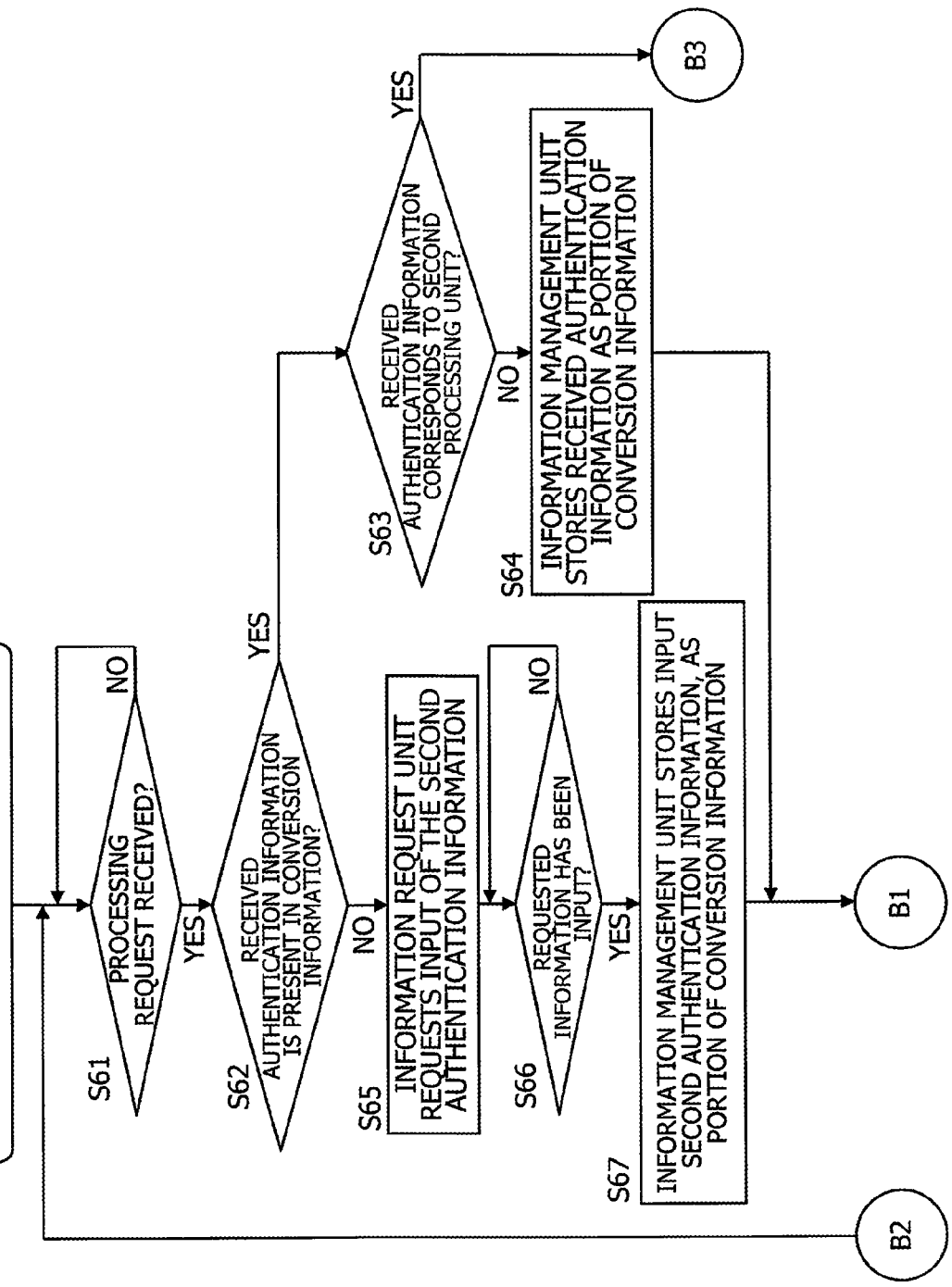
FIG. 15 is a flowchart diagrams illustrating the details of an information sharing process according to the first embodiment.
Figure 16:
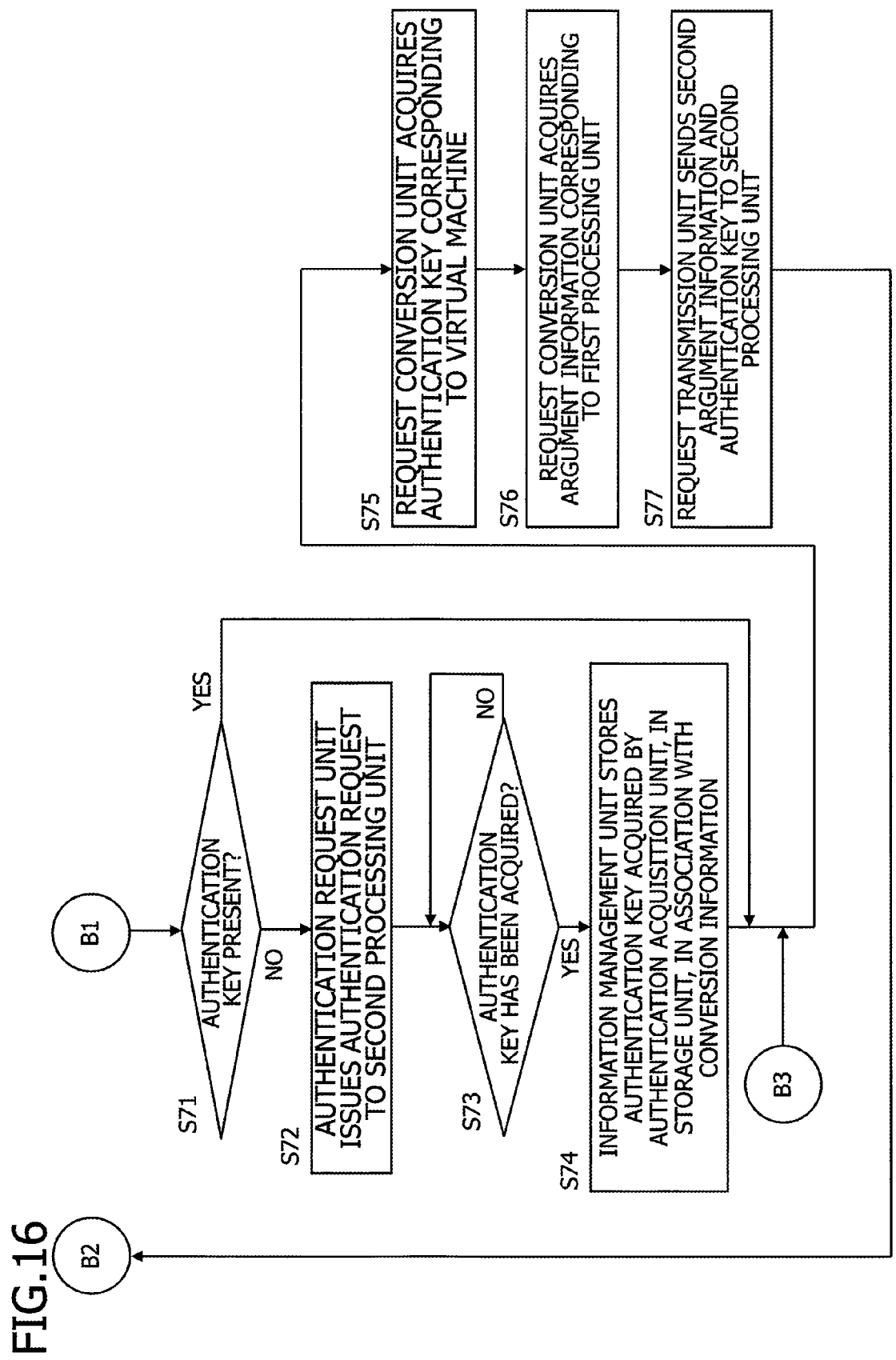
FIG. 16 is a flowchart diagrams illustrating the details of an information sharing process according to the first embodiment.

Thereupon, as illustrated in FIG. 15, the request acquisition unit 213B of the physical machine 2B, similarly to the case of the physical machine 2A, for example, waits for the virtual machine operating on the physical machine 2B to send processing request information corresponding to the second processing unit 21B (NO at S61). When processing request information 231A is sent from the virtual machine that has transferred from the physical machine 2A to the physical machine 2B (YES at S61), then the request acquisition unit 213B, for example, traps the transmitted processing request information 231A.

Next, the request conversion unit 214B of the physical machine 2B, for example, determines whether or not the authentication information 241A contained in the processing request information 231A acquired by the request acquisition unit 213B is present in the conversion information 233B stored in the information storage region 230B (S62). If the authentication information 241A is present in the conversion information 233B (YES at S62), then the request conversion unit 214B, similarly to the case of the physical machine 2A, for example, determines whether or not the acquired authentication information 241A is authentication information 241B corresponding to the second processing unit 21B (S63). If, as a result of this, the acquired authentication information 241A is not authentication information corresponding to the second processing unit 21B (NO at S63), then the information management unit 212B, for example, stores the acquired authentication information 241B as a portion of the conversion information 233B (S64).

On the other hand, if the authentication information 241A contained in the processing request information 231A acquired by the request acquisition unit 213B is not present in the conversion information 233B (NO at S62), then the information request unit 216B, similarly to the case of the physical machine 2A, for example, requests the input of the corresponding authentication information 241B (S65). Thereafter, the information request unit 216B, for example, waits for the input of the requested authentication information 241B (NO at S66). When the authentication information 241B is input (YES at S66), the information management unit 212B stores the input authentication information 241B in the information storage region 230B as a portion of the conversion information 233B (S67). A concrete example of the conversion information 233B is described below.

FIG. 21 is an example of the conversion information 233B illustrating a case where, after the state illustrated in FIG. 19, information corresponding to the user name and password corresponding to the second processing unit 21B is stored in S64 or S67. Below, an example where the information is stored in S64 is described. Furthermore, in the following description, it is supposed the second processing unit 21B and MON-B are mutually corresponding.

More specifically, the information corresponding to the user name and the password for executing MON-B is not set in the conversion information 233B illustrated in FIG. 19 (NO at S62). Therefore, as illustrated in FIG. 21, the information management unit 212B sets the user name and password contained in the processing request information 231B acquired by the request acquisition unit 213B (S64). More specifically, in the example illustrated in FIG. 21, the information management unit 212B sets "142_A3", which is the input user name, in the "authentication information" corresponding to the information for which the "process name" is "MON-B" and the "metadata" is "user name". As illustrated in FIG. 21, the information management unit 212B sets "24dfek", which is the input password, in the "authentication information" corresponding to the information for which the "process name" is "MON-B" and the "metadata" is "password". More specifically, the information management unit 212B updates the conversion information 233A acquired by the information management unit 212B. Consequently, the information management unit 212B is able to accumulate information without recognizing the difference in the physical machines on which the transferred virtual machine is operating.

Returning to FIG. 16, the authentication request unit 217B of the physical machine 2B, similarly to the case of the physical machine 2A, for example, determines whether or not the authentication key corresponding to the second processing unit 21B is included in the conversion information 233B (S71). If the authentication key corresponding to the second processing unit 21B is not present in the conversion information 233B (NO at S71), then the authentication request unit 217B of the physical machine 2B sends the user name and password included in the conversion information 233B, for example, to the second processing unit 21B, and issues an authentication request to the second processing unit 21B (S72). Thereupon, the authentication acquisition unit 218B of the physical machine 2B waits for the first processing unit 21A to send an authentication key (NO at S73). When the authentication acquisition unit 218B acquires the authentication key (YES at S73), the information management unit 212B, for example, stores the acquired authentication key in the information storage region 230B in association with the conversion information 233B (S74). If the authentication acquisition unit 218B does not acquired an authentication key, then the authentication acquisition unit 218B may return to S65. On the other hand, when the authentication key corresponding to the second processing unit 21B is present in the conversion information 233B (YES at S63 or YES at S71), then the authentication request unit 217B does not carry out processing for acquiring an authentication key, etc.

FIG. 22 is an example of conversion information 233B illustrating a case where, after the state illustrated in FIG. 21, the authentication key corresponding to MON-B is stored (S74). In this case, the information management unit 212B, as illustrated in FIG. 22, sets "G49vk3xE", which is the authentication key acquired by the authentication acquisition unit 218B, in the "authentication information" corresponding to the information for which the "process name" is "MON-B" and the "metadata" is "authentication key".

Returning to FIG. 16, after S74 or a YES result in S63, the request conversion unit 214B, for example, acquires the authentication key corresponding to the second processing unit 21B from the information storage region 230B (S75). Furthermore, the request conversion unit 214B refers to the argument conversion information 234B and converts the argument information 242A contained in the processing request information 231A received in S71, to the argument information 242B which can be processed by the second processing unit 21B (S76).

More specifically, in the example in FIG. 20, when the argument information contained in the processing request information 231A sent from the virtual machine that has transferred from the physical machine 2A is "DDD", then the request conversion unit 214B refers to the argument conversion information 234B. The request conversion unit 214B then acquires "FFF", which is the information for which the "process name" is "MON-B" and which corresponds to "argument information" of "DDD".

The request transmission unit 215B sends the authentication key acquired by the request conversion unit 214B in S75, and the argument information 242B converted by the request conversion unit 214B in S46 (S77).

In other words, the physical machines according to the present embodiment progressively accumulate the processing request information in the conversion information, each time a processing request information is sent to the processing unit in the physical machine. When a virtual machine operating on that physical machine is transferred to another physical machine, for example, then conversion information in which the processing request information has been accumulated is sent to the transfer-destination physical machine. Thereby, the transfer-destination physical machine is able to accumulate new processing request information by updating the conversion information received from the transfer-source physical machine, when new processing request information is sent from the virtual machine operating on the transfer-destination physical machine. The physical machine then converts the processing request information by referring to the conversion information, and therefore it is possible to restrict the frequency with which the input of processing request information is requested of the user. Consequently, it is possible to restrict the frequency with which interruption of services occurs in the physical machine.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing therein an information sharing program for causing a computer to execute a process comprising:

storing, in a storage, conversion information including first processing request information for issuing a processing request to a first processing processor that operates on a first physical machine, first operating environment information relating to an operating environment of the first physical machine and corresponding to the first processing request information, and second operating environment information relating to an operating environment of a second physical machine different from the first physical machine and corresponding to second processing request information for issuing a processing request to a second processing processor that operates on the second physical machine; and when a virtual machine that operates on the first physical machine transfers to the second physical machine, until transfer of the virtual machine to the second physical machine is completed, sending the conversion information from the first physical machine to the second physical machine; wherein when the virtual machine after the transfer sends the first processing request information and issues a processing request to the second processing processor, the second physical machine refers to the conversion information;

when the second processing request information corresponding to the second operating environment information and having the same contents as the first operating environment information corresponding to the first processing request information is present in the conversion information, the second physical machine converts the first processing request information corresponding to the processing request to the second processing processor into the second processing request information that is present in the conversion information and sends the second processing request information that is present in the conversion information to the second processing processor; and when the second processing processor sends a response relating to the second processing request information sent to the second processing processor, the second physical machine refers to the conversion information, reconverts the response into information that can be recognized by the virtual machine after the transfer and sends the information that can be recognized by the virtual machine after the transfer to the virtual machine after the transfer.

2. The non-transitory computer-readable storage medium according to claim 1, wherein when the second processing request information corresponding to the second operating environment information and having the same contents as the first operating environment information corresponding to the sent first processing request information is not present in the conversion information, the second physical machine sends the second processing request information that has been input, to the second processing processor, when the second processing request information that was not present has been input.

3. The non-transitory computer-readable storage medium according to claim 2, wherein when the second processing request information that was not present has been input, the second physical machine stores the input second processing request information, in a storage, in association with the conversion information.

4. The non-transitory computer-readable storage medium according to claim 1, wherein the first and second processing request information includes authentication information for the first processing processor or the second processing processor to carry out authentication of the virtual machine.

5. The non-transitory computer-readable storage medium according to claim 1, wherein the first operating environment information is information that enables the first physical machine to identify a type of the first processing request information, and the second operating environment information is information that enables the second physical machine to identify a type of the second processing request information.

6. An information sharing system comprising:

a first physical machine; and a second physical machine capable of accessing the first physical machine, wherein the first physical machine stores, in a storage, conversion information including first processing request information for issuing a processing request to a first processing processor that operates on the first physical machine, first operating environment information relating to an operating environment of the first physical machine and corresponding to the first processing request information, and second operating environment information relating to an operating environment of the second physical machine different from the first physical machine and corresponding to second processing request information for issuing a processing request to a second processing processor that operates on the second physical machine;

when a virtual machine that operates on the first physical machine transfers to the second physical machine, until transfer of the virtual machine to the second physical machine is completed, sending the conversion information from the first physical machine to the second physical machine;

when the virtual machine after the transfer sends the first processing request information and issues a processing request to the second processing processor, the second physical machine refers to the conversion information;

when the second processing request information corresponding to the second operating environment information and having the same contents as the first operating environment information corresponding to the first processing request information is present in the conversion information, the second physical machine converts the first processing request information corresponding to the processing request to the second processing processor into the second processing request information that is present in the conversion information and sends the second processing request information that is present in the conversion information to the second processing processor; and when the second processing processor sends a response relating to the second processing request information sent to the second processing processor, the second physical machine refers to the conversion information, reconverts the response into information that can be recognized by the virtual machine after the transfer and sends the information that can be recognized by the virtual machine after the transfer to the virtual machine after the transfer.

7. An information sharing method, comprising:

storing, by a first physical machine, in a storage, conversion information including first processing request information for issuing a processing request to a first processing processor that operates on the first physical machine, first operating environment information relating to an operating environment of the first physical machine and corresponding to the first processing request information, and second operating environment information relating to an operating environment of a second physical machine different from the first physical machine and corresponding to second processing request information for issuing a processing request to a second processing processor that operates on a second physical machine;

when a virtual machine that operates on the first physical machine transfers to the second physical machine, until transfer of the virtual machine to the second physical machine is completed, sending, by the first physical machine, the conversion information from the first physical machine to the second physical machine;

when the virtual machine after the transfer sends the first processing request information and issues a processing request to the second processing processor, referring, by the second physical machine, to the conversion information;

when the second processing request information corresponding to the second operating environment information and having the same contents as the first operating environment information corresponding to the first processing request information is present in the conversion information, converting, by the second physical machine, the first processing request information corresponding to the processing request to the second processing processor into the second processing request information that is present in the conversion information and sends the second processing request information that is present in the conversion information to the second processing processor; and when the second processing processor sends a response relating to the second processing request information sent to the second processing processor, referring, by the second physical machine, to the conversion information, reconverting, by the second physical machine, the response into information that can be recognized by the virtual machine after the transfer and sending, by the second physical machine, the information that can be recognized by the virtual machine after the transfer to the virtual machine after the transfer.

* * * * *